United States Patent [19]

Hirabayashi

[11] Patent Number: 5,642,566

[45] Date of Patent: Jul. 1, 1997

[54] ELECTRIC POWERED CABLE CUTTER

[75] Inventor: Shigeru Hirabayashi, Matsumoto, Japan

[73] Assignee: Izumi Products Company, Nagano-ken, Japan

[21] Appl. No.: 661,737

[22] Filed: Jun. 1, 1996

[51] Int. Cl.⁶ .................................................. B26B 15/00
[52] U.S. Cl. ................................ 30/228; 30/249; 30/250; 30/92
[58] Field of Search ............................ 30/92, 180, 188, 30/187, 205, 210, 216, 228, 247, 249, 250; 83/580, 600

[56] References Cited

U.S. PATENT DOCUMENTS

| | | | |
|---|---|---|---|
| 3,178,816 | 4/1965 | Schmid | 30/247 X |
| 4,644,650 | 2/1987 | Laux et al. | 30/92 X |
| 5,067,240 | 11/1991 | You | 30/92 X |
| 5,184,404 | 2/1993 | Chen | 30/250 |

*Primary Examiner*—Douglas D. Watts
*Attorney, Agent, or Firm*—Longacre & White

[57] ABSTRACT

An electric cable cutter of the present invention comprises a housing, and a stationary blade and a moving blade which are exposed from the housing. The housing includes a body unit containing an electric motor and a planetary reduction gear driven by the electric motor, a handle unit formed so as to be easily held by hand, and a power source unit to which a battery cartridge is inserted. A switch lever for operating the switch to drive the electric motor is placed on the holding unit. Owing to this structure, a user easily cuts a cable by one hand at the inconvenient places, e.g., at height. This electric cable cutter is portable because of the rechargeable battery, so that this cutter can be utilized in any place.

13 Claims, 24 Drawing Sheets

ELECTRIC POWERED CABLE CUTTER

BACKGROUND OF THE INVENTION

1. Field of the Invention

The present invention relates to a cable cutter for cutting cables such as telecommunication wires, and especially to a cable cutter which is portable and which cuts cables by driving a planetary reduction gear with an electric motor.

2. Prior Art

Cable cutters are utilized for cutting telecommunication wires, electric wires and other cables during construction. One kind of the conventional cable cutters holds an electric wire between clamps and cuts it with a hydraulic cutter. Another kind of cable cutters is a hand-operated cutter shown in FIG. 1. This cutter comprises a link 101 having a blade 101a at one end, a link 102 having a blade 102a, a link 103, and handles 104, 105, which constitute a toggle mechanism. In this cutter, as the handle 104 and the handle 109 are rotated in directions shown by arrows in FIG. 1, the blade 101a and the blade 102a are rotated around a shaft 106 in different directions, and a cable or the like held between the blades 101a, 102a is cut by a shearing stress.

Another kind of cutters is an electric cable cutter. The electric cable cutter comprises a cord to be connected to a power source, a driving unit for driving a blade, and a switch for starting and stopping the driving unit. A switch lever for operating the switch is provided on a handle where fingers are put on easily. In general, most of the switch levers have a safety unit (safety switch lever) not to operate the driving unit when the finger or the other part of the body accidentally touches the switch.

Most of the safety switch levers have the structure that the movement of the switch lever is prevented even though the switch lever is pressed. For example, a link moved together with a button is placed near the switch lever, and as the button is moved with the finger, the link prevents the movement of the switch lever.

Workers at the construction have to work under restricted circumstances, i.e., supporting their bodies by one hand at height, holding much stuff. Accordingly, the worker needs to utilize some kinds of supplementary units to use the cable cutter at inconvenient places such as at height and also needs physical strength.

Further, in the electric cutters having the safety switch lever, the safety switch lever cannot be operated by one hand, particularly by the hand (fingers) holding the cutter. Furthermore, since the cord to be connected to the power source is required, this kind of cutters can be used at the limited places.

SUMMARY OF THE INVENTION

It is an object of the present invention to provide an electric cable cutter which is portable and which is easily operated by one hand.

To achieve the above object, an electric cable cutter of the present invention comprises a housing, an electric motor provided in the housing, a planetary reduction gear driven by the electric motor,provided in the housing, a stationary blade which is fixed at the planetary reduction gear and which is provided in the housing so as to project from an opening of the housing, a moving blade having a first blade at an inner rib and a gear at an outer rib, which is provided in the housing so as to project from the opening of the housing and which is pivotally placed at the stationary blade with a shaft and which is rotated by the planetary reduction gear, a power source for the electric motor, and a switch for turning on and off the electric motor.

In this electric cable cutter, ther power source is a rechargeable battery, and the rechargeable battery is placed in a battery cartridge removable from the housing.

The gear formed on the outer rib of the moving blade may have a sector shape, and the stationary blade may have a second blade at an inner rib.

Further, it is preferable to attache a spring having a teeth substantially the same as tooth of the gear of the moving blade at at an end of the gear of the moving blade.

Further, a protector may be provided to the stationary blade so that fragments of the stationary blade are not scattered when the stationary blade is damaged.

Further, the electric cable cutter may comprise a switch lever for operating the switch, fixed at a driving unit of the switch, attached at an outer surface of the housing. The switch lever has a lock knob having a protrusion to be inserted in a concave formed in the housing. The switch drives the moving blade in a forward direction and a reverse direction by operating the switch lever. When the lock knob is pressed, the protrusion is released from the concave and the switch lever is movable in a direction to drive the switch. On the other hand, when the lock knob is not pressed, the protrusion is fitted in the concave to prevent the drive of the switch.

Further, a dust-proof brush may be attached at the opening of the housing so as to cover the opening and to sweep the moving blade. The dust-proof brush may comprise a setting plate member of polyacetals and animal hair set in the setting plate member.

In the electric cable cutter of the present invention, two edgeless stationary blades may be fixed at the planetary reduction gear with a predetermined space, and the moving blade is pivotally supported at the stationary blades so as to move between the two stationary blades.

Furthermore, it is preferable that area of portions of reaction opposite to portions of action of the moving blade and the stationary blade is formed large enough so that the location where the portions of reaction of the stationary blade and the moving blade are brought in contact during cable cutting is separated apart from the shaft by a predetermined length.

According to the electric cable cutter of the present invention, the electric cable cutter is held by one hand, and a material to be cut such as a cable is inserted between the moving blade and the stationary blade, and then the switch is turned on. The electric motor drives the planetary reduction gear, and a pinion of the planetary reduction gear engages with the gear of the moving blade. The moving blade is rotated around the supporting shaft to cut the cable. During cable cutting, the moving blade is swept, so that the chips attached thereto do not go inside the housing.

Further, according to the switch of the present invention, in the case that the lock knob is not pressed, since the protrusion of the lock knob is inserted in the concave of the housing which means a lock mode, the switch does not operate although the switch lever is pressed. Accordingly, the moving blade is not rotated. On the other hand, in the case that the lock knob is pressed, since the protrusion of the lock knob is released from the concave of the housing which means an unlock mode, the switch operates for rotating the moving blade. Accordingly, the switch of the electric cable is easily and safely operated by one hand holding the electric cable cutter.

Furthermore, the spring having the teeth which is substantially the same as the tooth of the gear of the moving blade so as to be continuous to the tooth of the gear with the same interval, so that the teeth of the spring leads the smooth engagement between the tooth of the moving blade and the pinion. Accordingly, as compared with the case that the tooth of the moving blade are directly engaged with the pinion, interference between the tooth and any damage do not occur.

The present invention will be more readily understood from the following preferred embodiments with reference to the accompanying drawings.

PREFERRED EMBODIMENTS OF THE INVENTION

Figure 1:
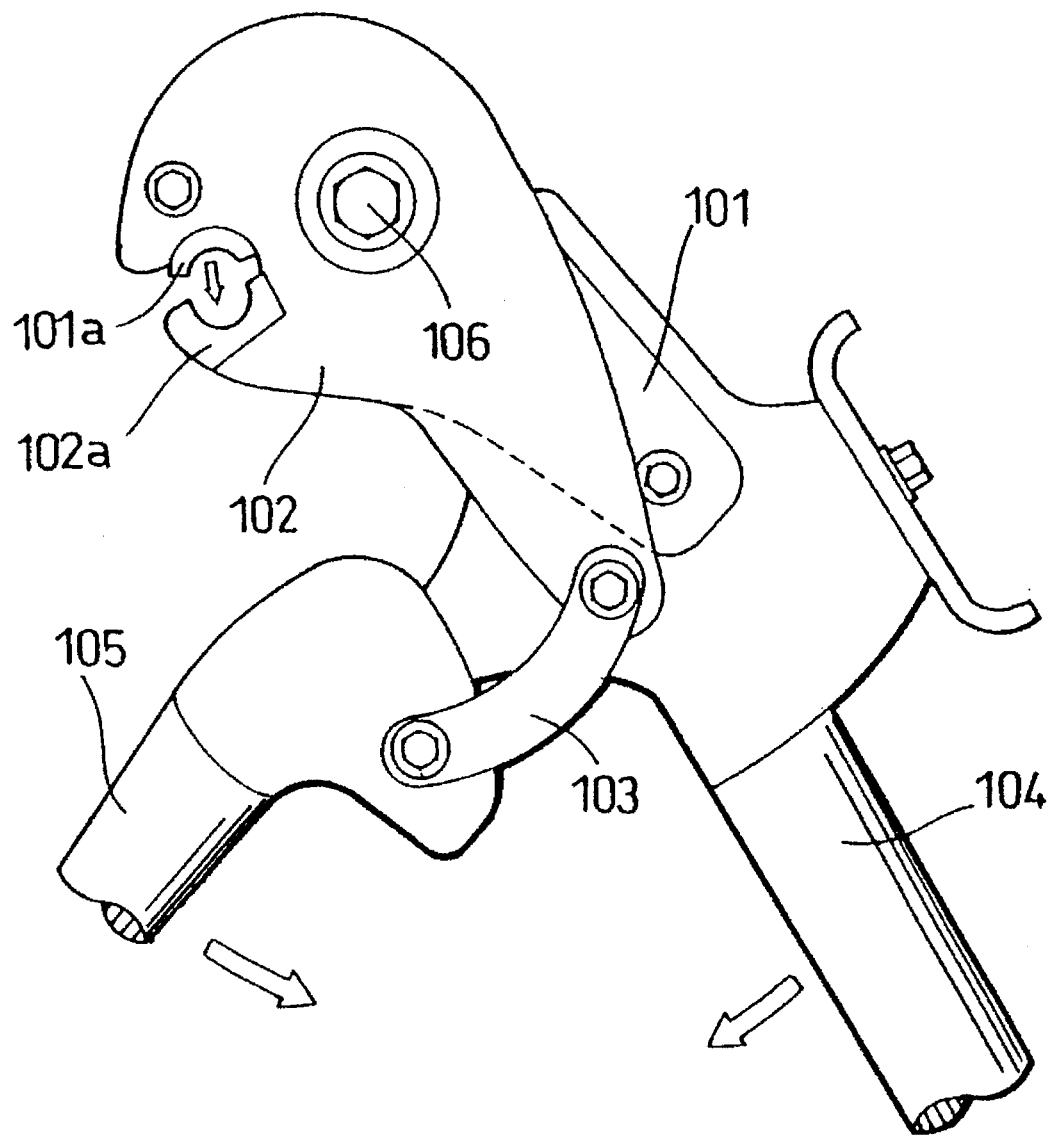
FIG. 1 is a schematic view showing a conventional cutter for cutting cables.

The preferred embodiments of the present invention will be described in detail with reference to the drawings hereinafter. In the description, the same reference numerals are used for the same components and repetitive description on the same components is omitted.

Figure 2:
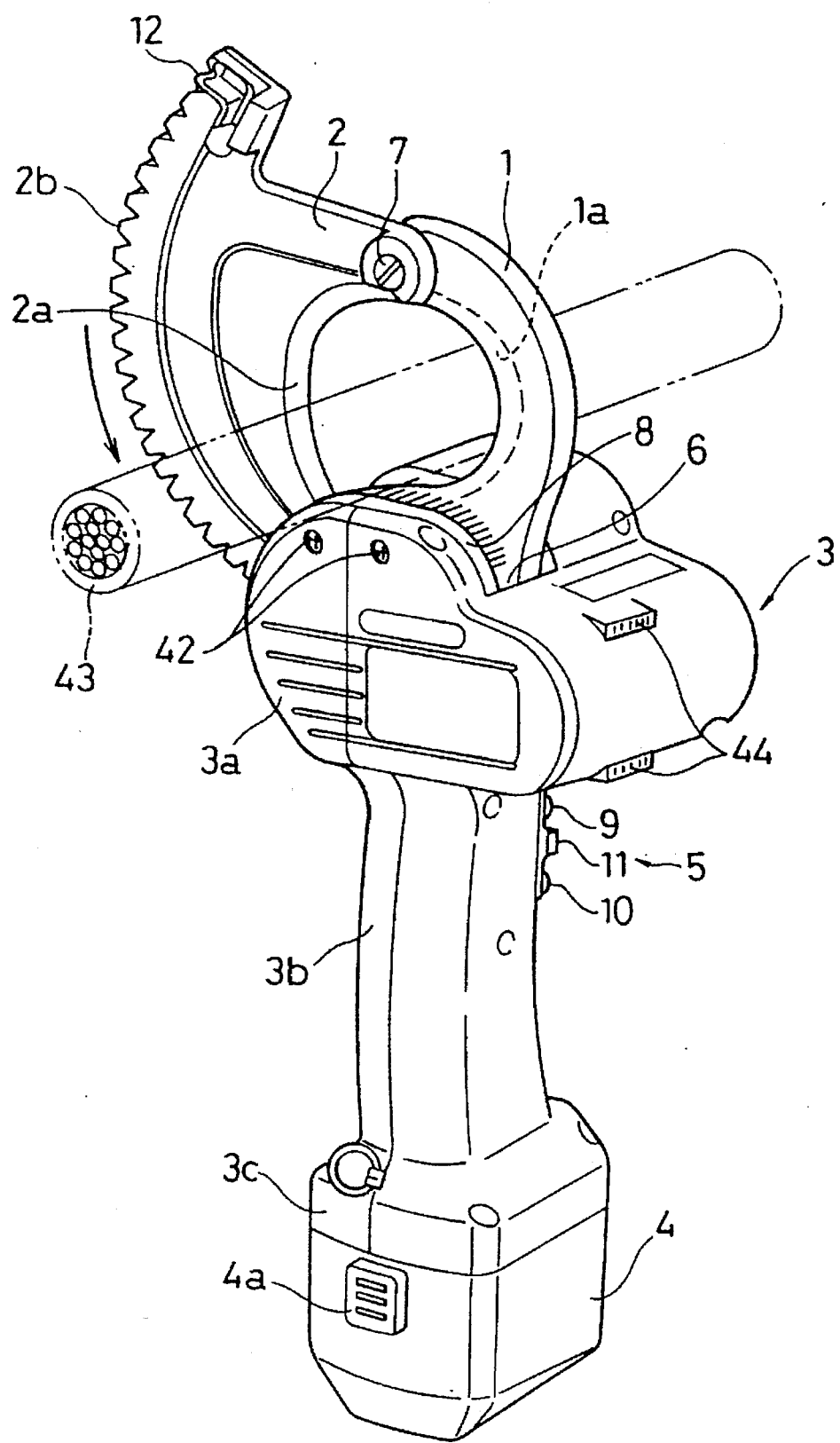
FIG. 2 is a perspective view showing an electric cable cutter according to the first embodiment of the present invention.
Figure 3:
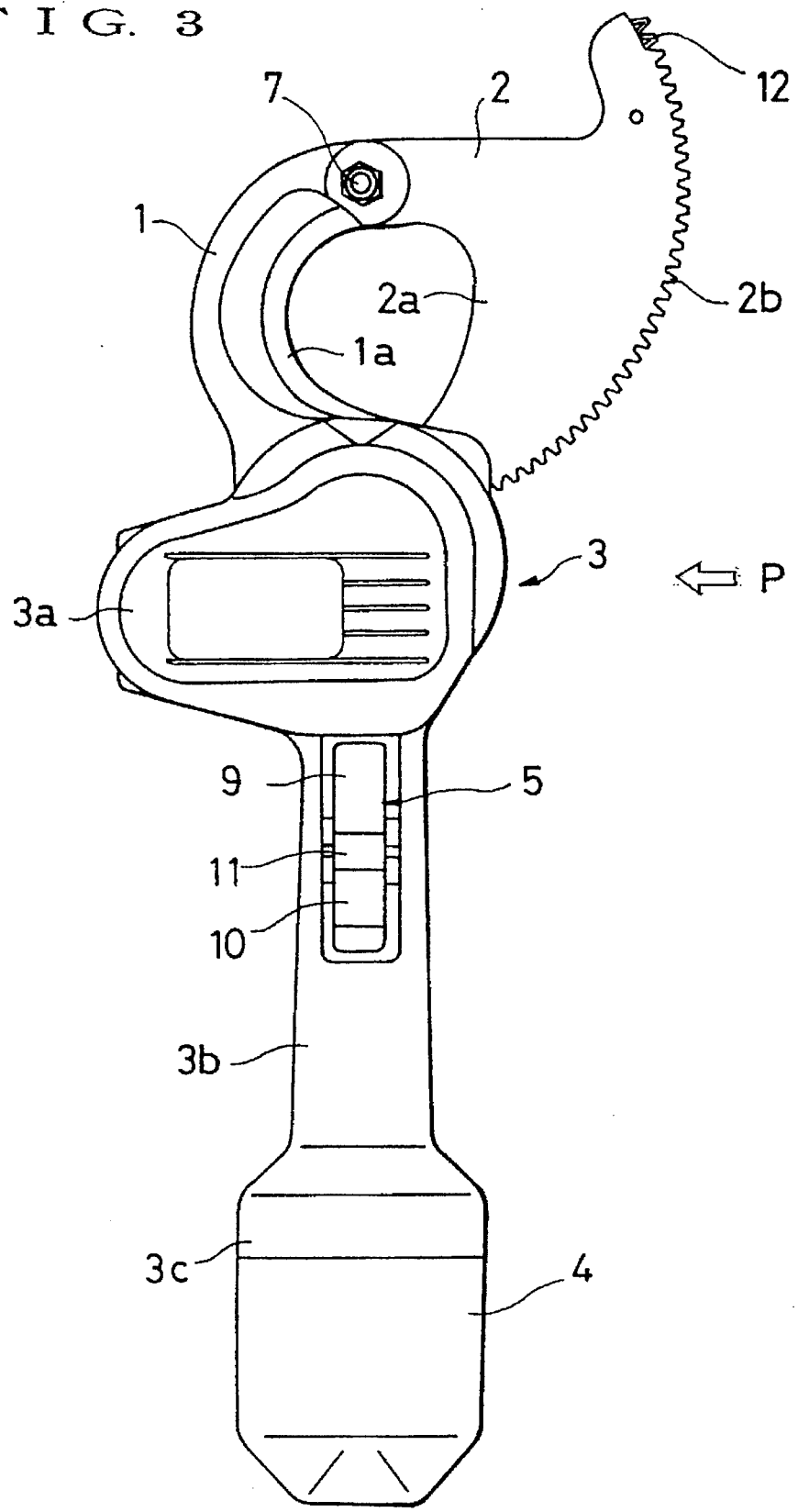
FIG. 3 is a front elevation view showing the electric cable cutter of the first embodiment.
Figure 4:
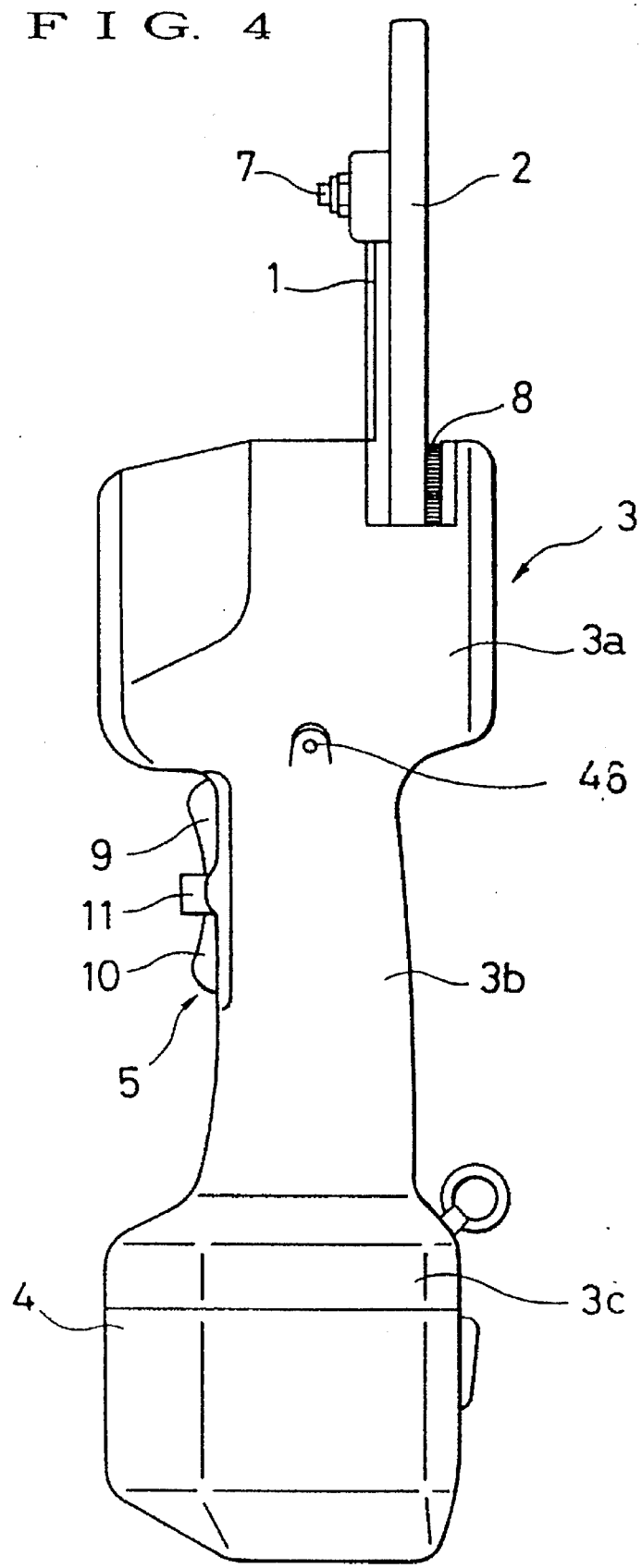
FIG. 4 is a side view showing the electric cable cutter of the first embodiment as seen from the P-direction of FIG. 3.
Figure 5:
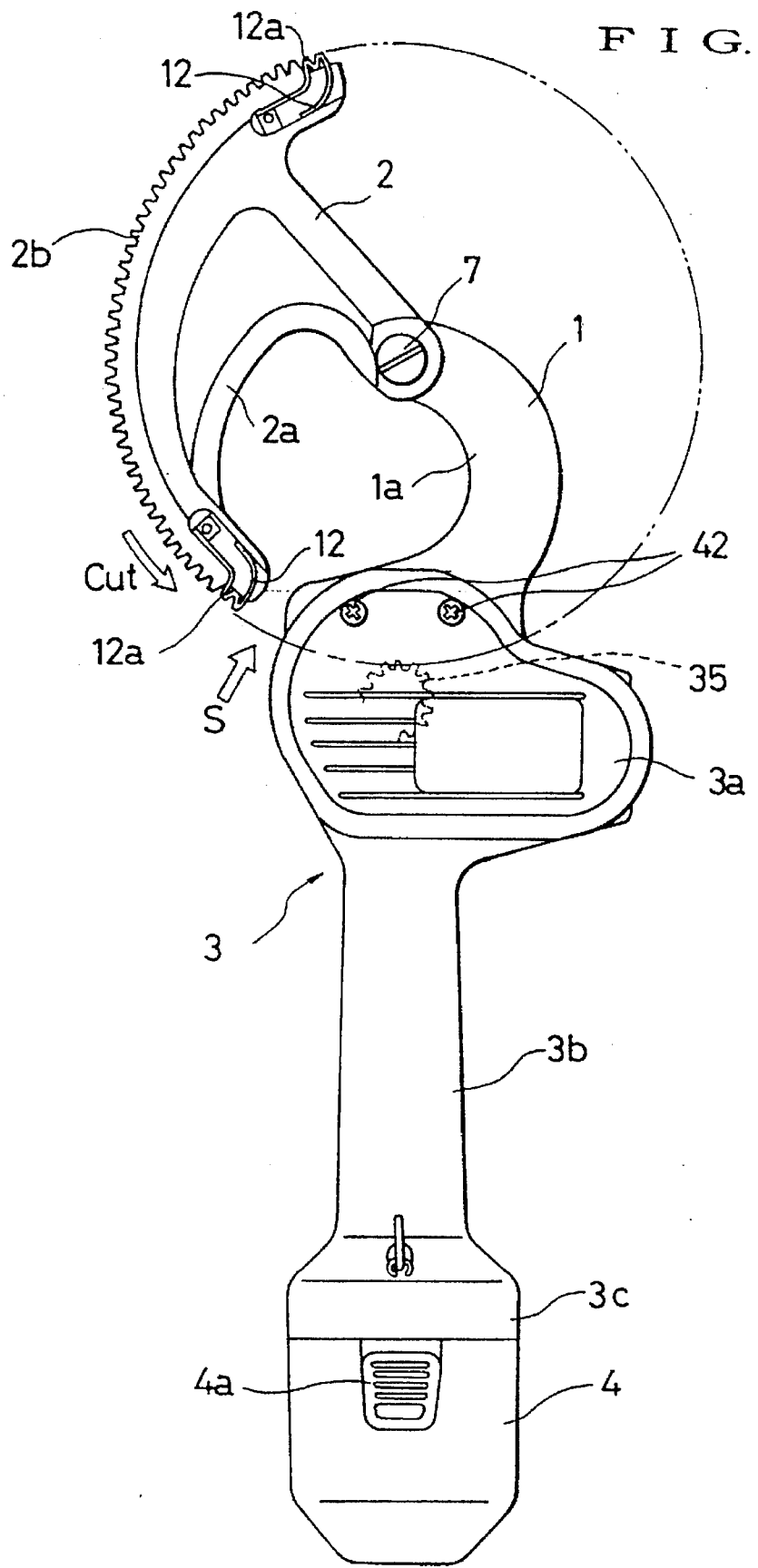
FIG. 5 is a rear view showing the electric cable cutter of the first embodiment before a moving blade is engaged with a pinion.

FIG. 2 is a perspective view of an electric cable cutter of the first embodiment of the present invention. FIG. 3 is a front view thereof. FIG. 4 is a side view thereof seen from a P-direction of FIG. 3. FIG. 5 is a rear view thereof.

In this electric cable cutter, all units are placed inside a housing 3 besides a stationary blade 1 and a moving blade 2 exposing. As shown in FIG. 2–FIG. 5, the housing 3 is made of plastic, and comprises a body unit 3a containing an electric motor which is described later and a planetary reduction gear driven by the electric motor, a handle unit 3b formed so as to be easily held by one hand, and a power source unit 3c to which a battery cartridge 4 is inserted. A switch lever 5 for operating the switch to drive the electric motor is placed on the holding unit 3b.

The switch lever 5 placed on the handle unit 3b of the housing 3 comprises a forward switch lever 9 for driving the electric motor in forward mode, a reverse switch lever 10 for driving the electric motor in reverse mode, and a lock knob 11 placed therebetween. For the safety purpose, the forward switch lever 9 and the reverse switch lever 10 are on when the lock knob 11 is pressed together.

In a case of excess current flowing into the electric motor, e.g., when it is utilized for other materials other than specified cables or when the motor is overheated after used for long hours, in order to prevent the motor from burning, there placed a circuit breaker (reference numeral 45 in FIG. 11) in the housing 3. If the cable cutter stops operating when the circuit breaker is activated, a reset pin 46 projects from the housing 3. To restart the electric cable cutter, after it is left for tens seconds, the reset pin 46 is pressed back into position.

The body unit 3a of the housing 3 has a ventilation opening 44 in order to prevent the overheat of the body unit 3a due to the driving unit such as the electric motor and the planetary reduction gear.

There provided an opening 6 at the top of the body unit 3a, and the stationary blade 1 which has an arc-shaped blade 1a and one end of which is fixed at the planetary reduction gear is projected from the opening 6. The sector-shaped moving blade 2 is provided at the projecting end of the stationary blade 1 with a supporting shaft 7. The moving blade 2 has an arc-shaped blade 2a at the inner rib and a gear 2b at the outer rib so as to be engaged with a pinion 35 (output gear). Further, there provided a dust-proof brush 8 so as to cover the opening 6 and to contact the stationary blade 2 firmly. The battery cartridge 4 removable from the power source unit 3c is detached from the housing 3 by pulling out the cartridge 4 while pressing a latch 4a.

Figure 6:
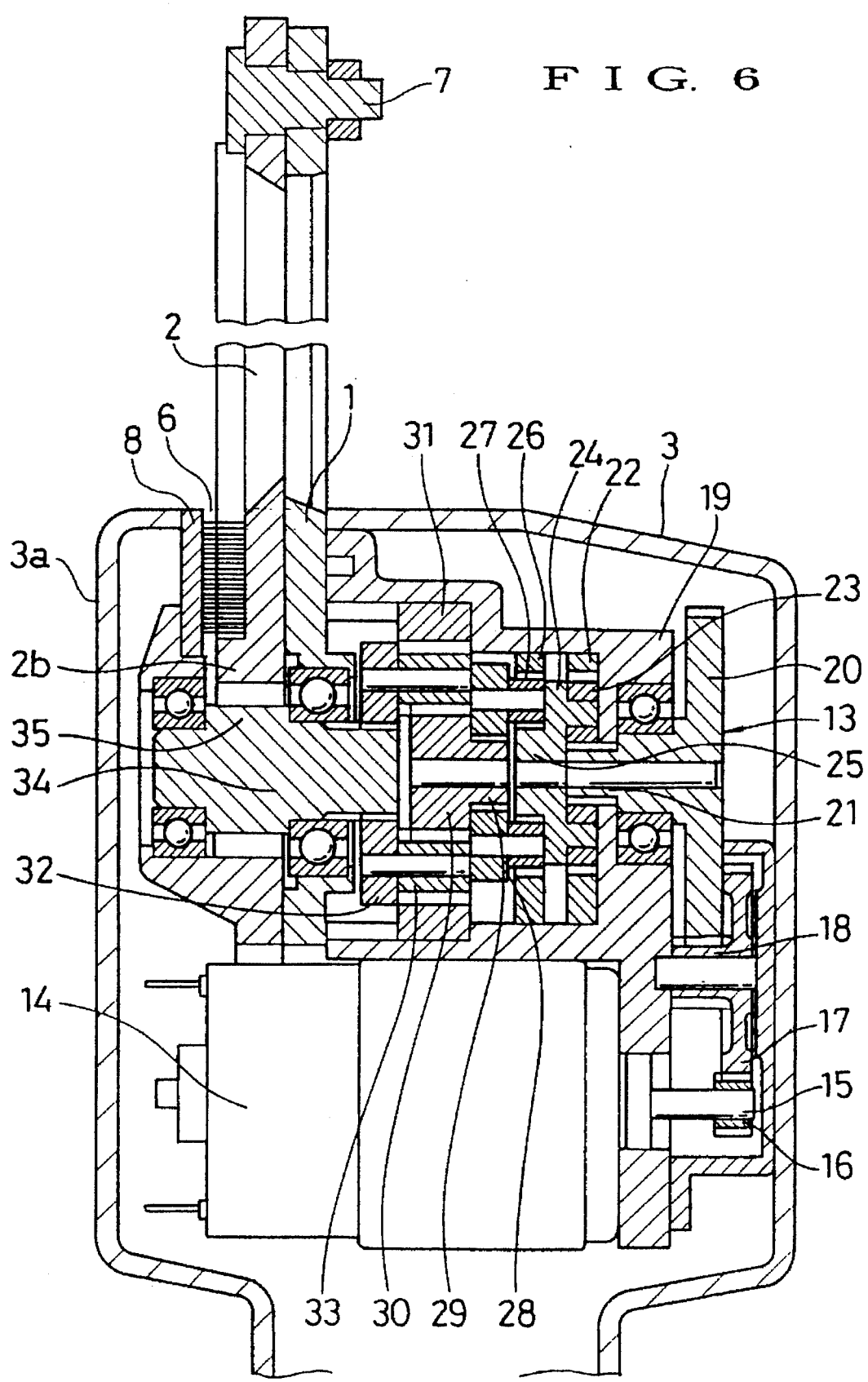
FIG. 6 is a cross sectional view showing the internal structure of a planetary reduction gear of the electric cable cutter of the first embodiment.

Next, the planetary reduction gear 13 placed inside the body unit 3a of the housing 3 of the electric cable cutter of the present embodiment will be described in detail. The internal structure of the planetary reduction gear 13 is shown in FIG. 6.

The planetary reduction gear 13 conducts five-stage reduction. The first stage reduction is operated by a first pinion 16 pivotally placed at one end of a driving shaft 15 of the electric motor 14 and a first gear wheel 17 to be engaged with the first pinion 16. The second stage reduction is operated by a second pinion 18 formed on the same shaft as the first gear wheel 17 and a second gear wheel 20 which is pivotally supported at a gear case 19 with a bearing and which is engaged with the pinion 18.

A first sun gear 21 which is a pinion having a small diameter is formed on the same shaft as the second gear wheel 20. The third stage reduction is operated by the first sun gear 21 and a planet gear 23 to be engaged with a first internal gear 22 fixed at the gear case 19. A plurality of planet gears 27 are arranged between a second sun gear 25 integratedly formed with a planetary retaining plate 24 for transmitting the rotation of the planet gear 23 and a second internal gear 26 fixed at the gear case 19, which performs the forth stage reduction.

Further, a third sun gear 30 is formed at a shaft 29 to be spline-coupled with the planet retaining plate 28. A planet gear 33 held at a planet retaining plate 32 and provided between a third sun gear 30 and the third internal gear 31 fixed at the gear case 19. These perform the fifth stage reduction. The rotation of the planet gear 33 is transmitted to the pinion (output gear) 35 through an output shaft 34 spline-coupled with the planet retaining plate 32. This five-stage reduction gives a large torque at the pinion 35 which rotates the moving blade 2.

Next, the cutter unit constituted with the stationary blade 1 and the moving blade 2 of the electric cable cutter of the present embodiment will be explained in detail.

Figure 7:
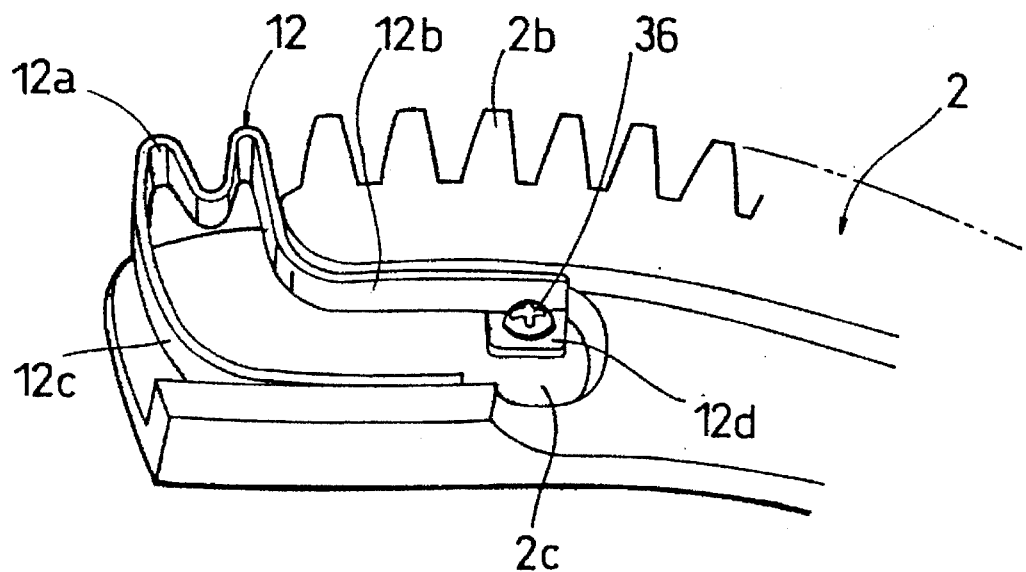
FIG. 7 is a perspective view showing an end of a gear of the moving blade of the electric cable cutter of the first embodiment.

FIG. 7 is a perspective view showing one end of the sector-shaped gear 2b of the moving blade 2. An elongated plate spring 12 is attached to the end of the tooth of the gear 2b of the moving blade 2. The spring 12 has a teeth 12a which has substantially the same shape as the tooth 2b of the gear 2b. This spring 12 is fixed at the end of the tooth of the gear 2b by fitting plate portions 12b and 12c extended from the ends of the teeth 12a into a lower place 2c formed at the end of the moving blade 2 and screwing a L-shaped plate portion 12d with a screw 36. It is preferable that the height and thickness of the teeth 12a of the spring 12 are formed substantially the same as the tooth of the gear 2b. Further, it is preferable that the spring 12 is attached to the end of the moving blade 2 such that the teeth 12a is continuous to the tooth of the gear 2b with substantially the same interval. Such a spring 12 having the teeth 12a is also attached to the other end of the moving blade 2.

Figure 8:
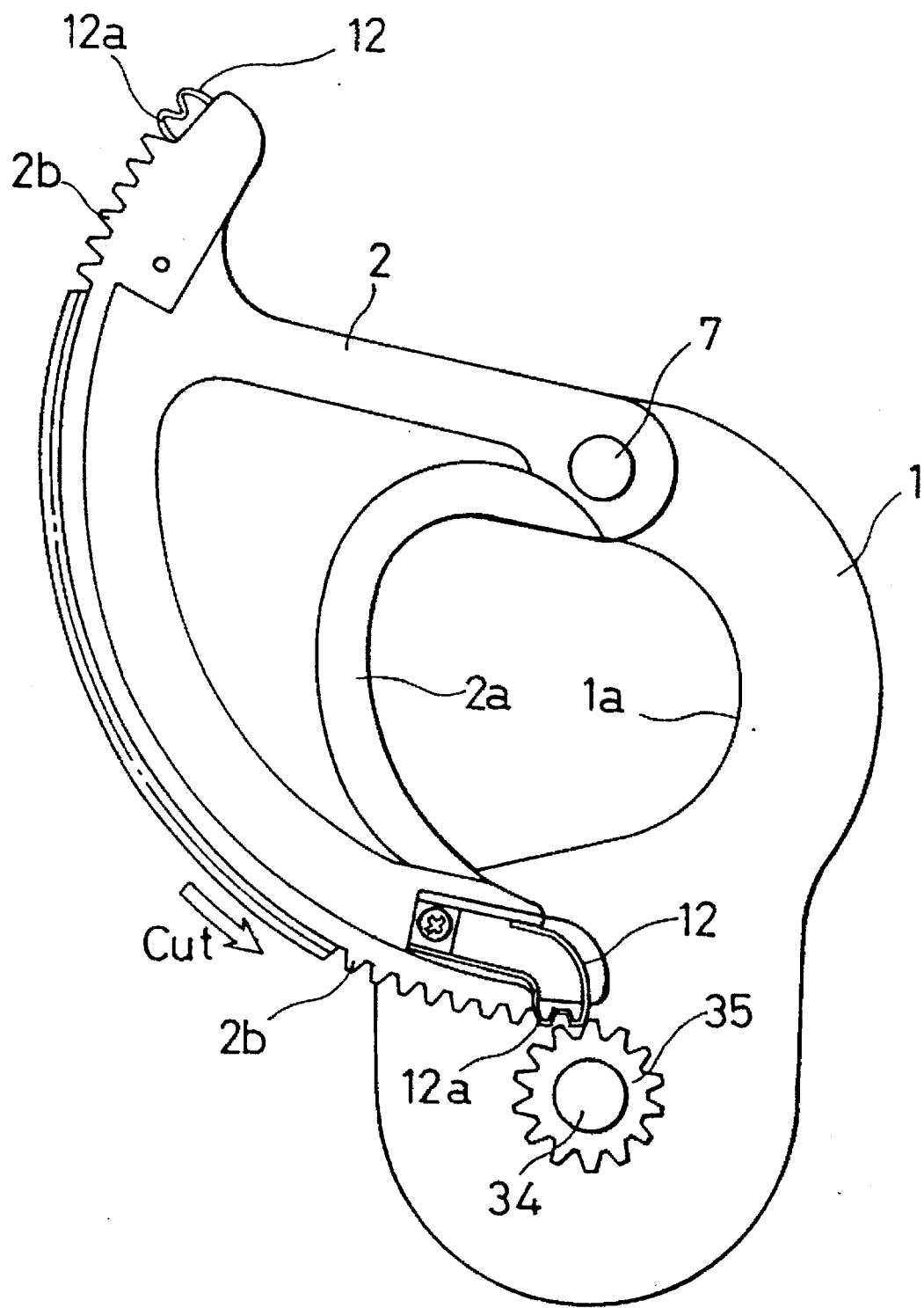
FIG. 8 is a front view showing a cutter unit of the electric cable cutter of the first embodiment when the moving blade constituting the cutter unit starts engaging with the pinion.
Figure 9:
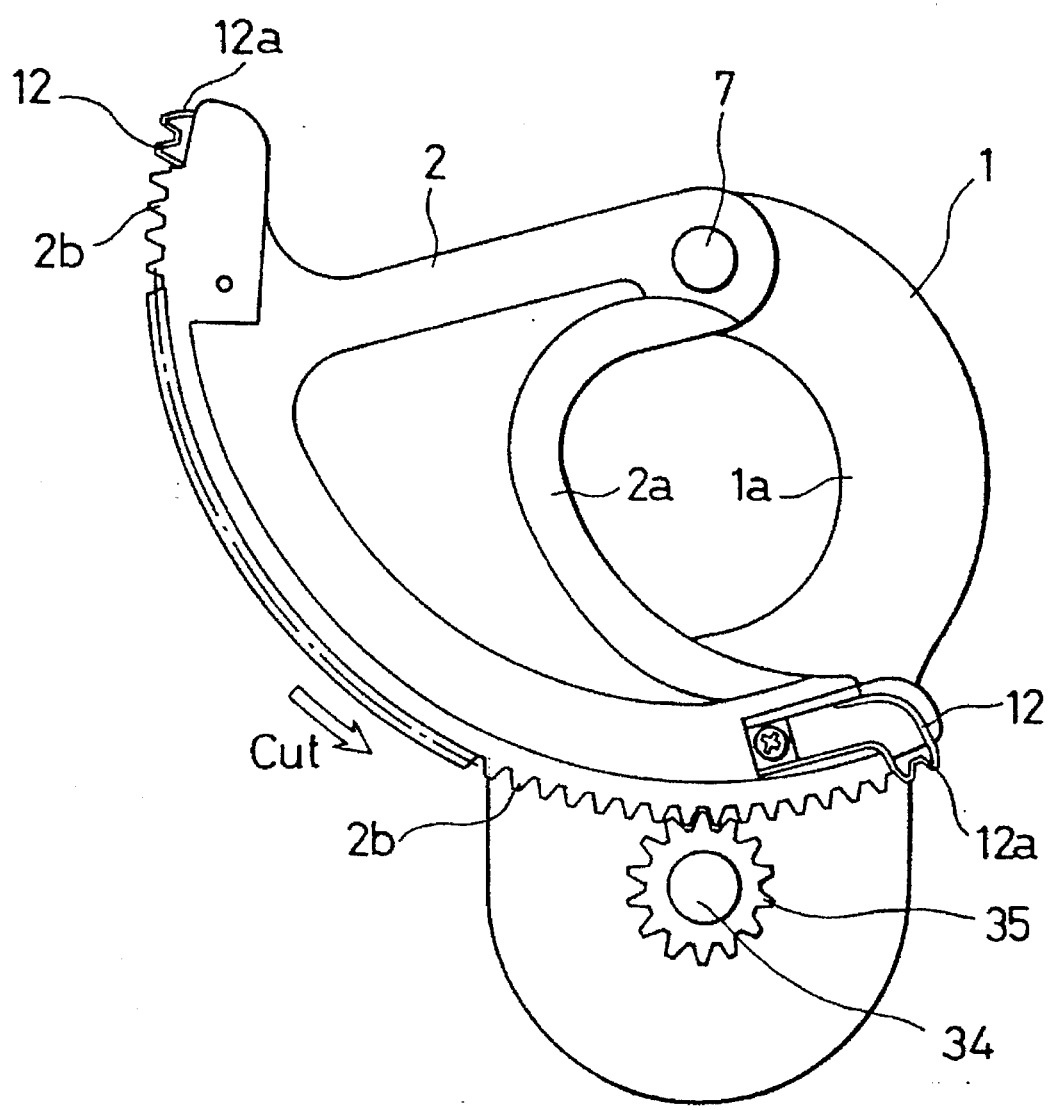
FIG. 9 is a front view showing the cutter unit of the electric cable cutter of the first embodiment when the moving blade engages with the pinion.

FIG. 8 shows the moving blade 2 starting the engagement with the pinion 35, and FIG. 9 shows the moving blade 2 engaged with the pinion 35. When the moving blade 2 does not touch with the pinion 35, the moving blade 2 does not start rotating, so that the teeth of the gear 2b needs to be brought into contact with the tooth of the pinion 35. Then, as the pinion 35 is driven by the above-described driving mechanism, the teeth 12a of the spring 12 attached at the end of the tooth 2b of the moving blade 2 is engaged with the pinion 35. At this point, the teeth 12a of the spring 12 is transformed to be engaged with the pinion, and then the tooth of the gear 2b are smoothly engaged with the pinion 35. In other words, the teeth 12a of the spring 12 leads the smooth engagement between the pinion 35 and the gear 2b. Accordingly, as compared with the a case that the tooth of the gear 2b of the moving blade 2 are directly engaged with the pinion 35, in the case of the moving blade 2 with the spring 12, the engagement is very smooth, and the tooth of the moving blade 2 and the pinion 35 do not nick.

Figure 10:
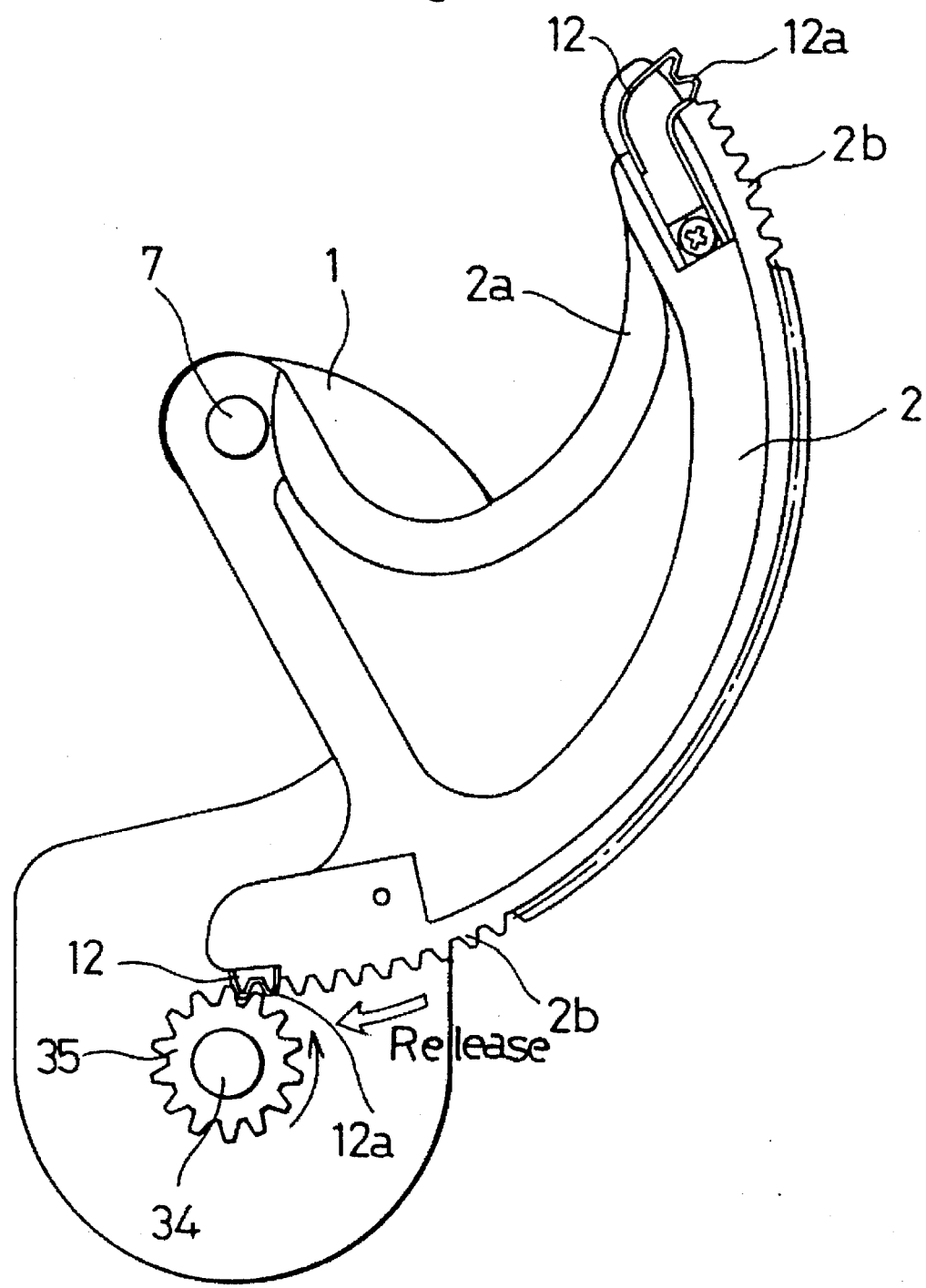
FIG. 10 is a front view showing the cutter unit of the electric cable cutter of the first embodiment when the moving blade completes engaging with the pinion.

FIG. 10 shows the completion of the engagement between the moving blade 2 and the pinion 35. Since the tooth 12a similar to the tooth of the gear 2b are attached to both ends of the tooth of the moving blade 2, if the moving blade 2 is rotated in reverse, the teeth 12a guides the tooth of the gear 2b to be smoothly engaged with the pinion.

Next, the structure of the switch and the switch lever of the electric cable cutter will be described in detail.

Figure 11:
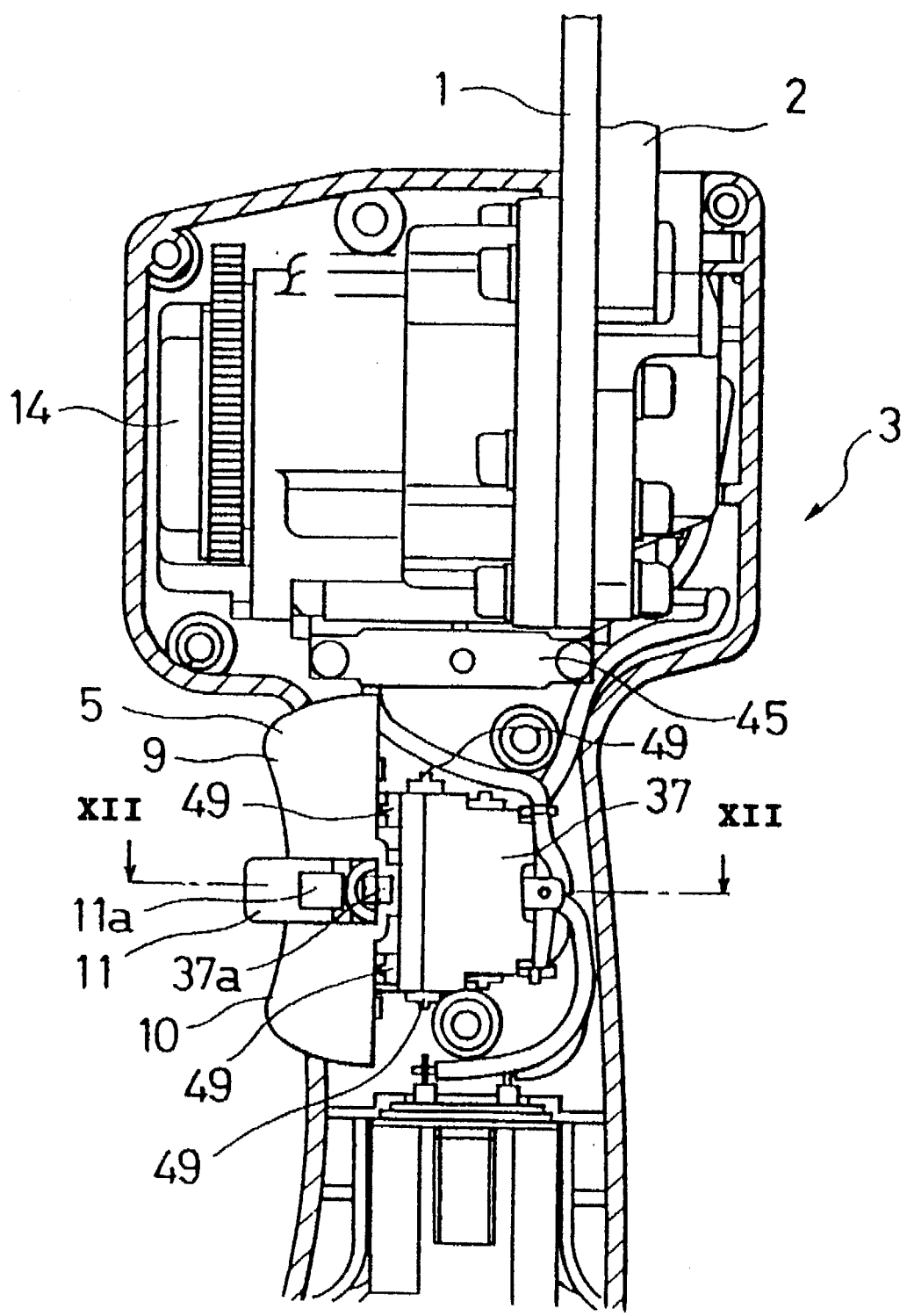
FIG. 11 is a schematic view showing the internal structure of the housing of the electric cable cutter of the first embodiment.
Figure 12:
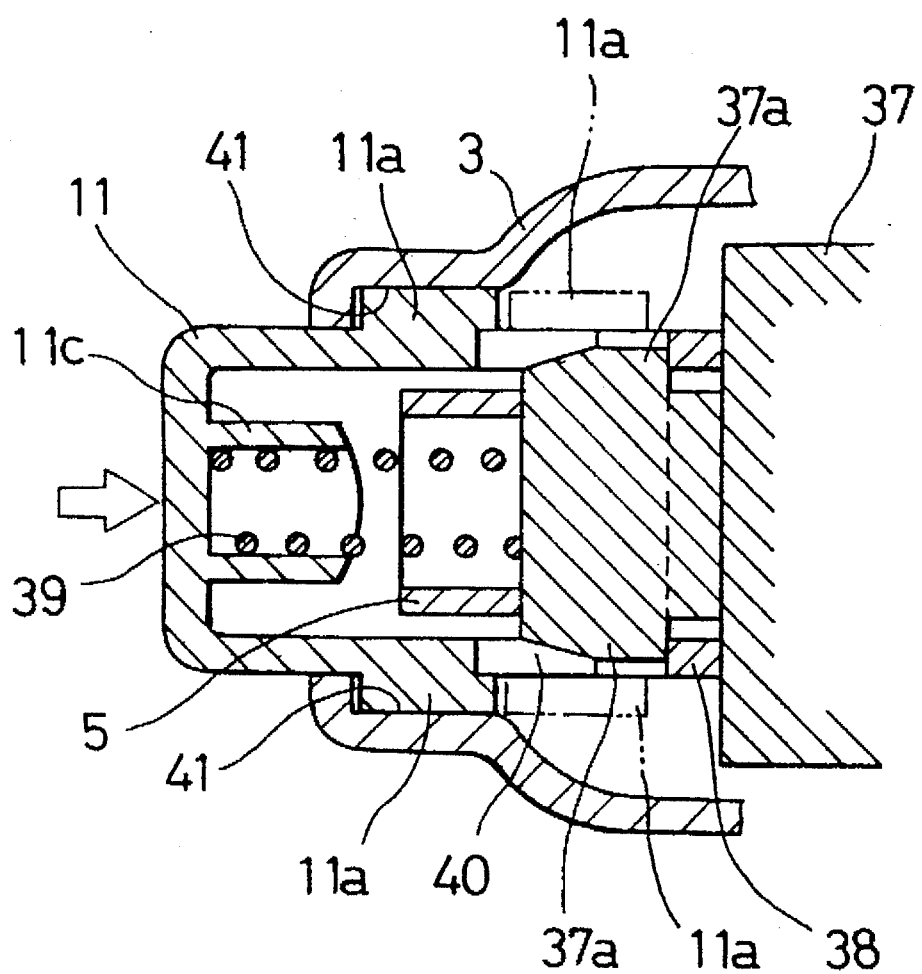
FIG. 12 is a cross sectional view taken along the line B—B of FIG. 11.

FIG. 11 shows the internal structure of the body unit 3a and the handle unit 3b of the housing 3. FIG. 12 shows the cross section taken along the line B—B of FIG. 11. As shown in FIG. 11, the switch lever 5 is attached to the handle unit 3b, and the switch 37 is attached to the housing 3 with hooks 49 provided in the housing 3. The switch 37 comprises a rectangular driving shaft 37a to which a rib portion 38 is inserted to be fixed therein. In the case of FIG. 11, the switch 37 does not turn on even the switch lever 5 is operated. On the other hand, when the forward switch lever 9 is pressed while the lock knob 11 is pressed, the switch 37 turns on so that the pinion 35 drives the moving blade 2 in the forward direction (in a direction to cut the cable shown by the arrow in FIG. 8). When the reverse switch lever 10 is pressed while the lock knob 11 is pressed, the switch 37 turns on so that the pinion 35 drives the moving blade 2 in the reverse direction (in the direction shown by the arrow in FIG. 10.)

Figure 13:
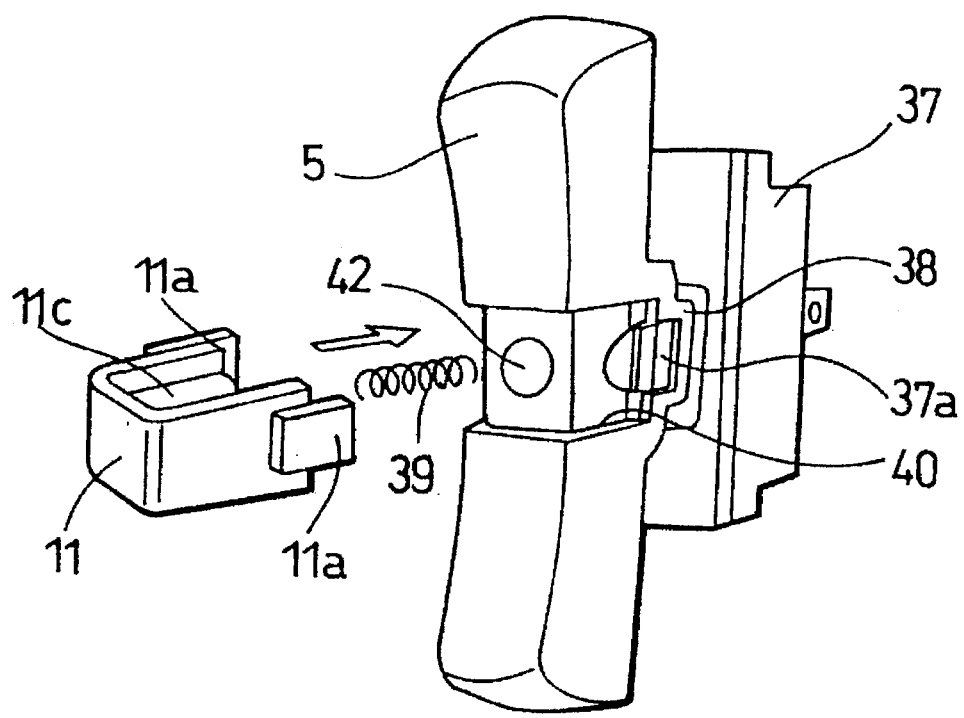
FIG. 13 is a perspective view showing the switch lever of the electric cable of the first embodiment.

As shown in FIG. 12 and FIG. 13, the lock knob 11 has hooks 11a at the outer surface, and a cylindrical projection 11c to which a spring 39 is inserted. The lock knob 11 is fitted in a lower place 40 formed at the center of the switch lever 5. To do this assembly, the cylindrical protrusion 11c with the spring 39 inserted is inserted into the hole 42 formed in the lower place 40 of the switch lever 5, and the switch 37 and the switch lever 5 are attached to the handle unit 3b of the housing 3.

Figure 14:
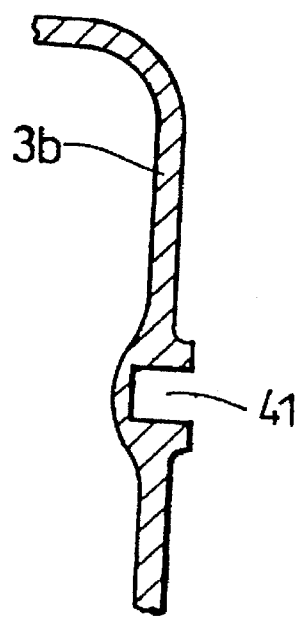
FIG. 14 is a partial sectional view showing a handle unit of a housing.

As shown in FIG. 12 and FIG. 14, a rectangular concave 41 is formed at the sides of the handle unit 3b of the housing 3 so that the hooks 11a formed at the sides of the lock knob 11 are fitted therein. To attache the switch 37 and the switch lever 5 to the housing 3, the rectangular hooks 11a of the lock knob 11 are inserted into the concave 41. Then, the lock knob 11 is attached to the housing 3 in such a matter that it can slightly be moved in the lower place 40 of the switch lever 5 and that, when the lock knob 11 is pressed, e.g., by the finger, the hooks 11a are released from the housing 3 by the elasticity of the spring 39, and that, when the finger is released from the lock knob 11, the hooks 11a are inserted in the concave 41 again. In other words, the lock knob is attached to the housing 3 so that the hooks 11a can freely be inserted in and removed from the concave 41.

The operation of the switch lever 5 having the above-described structure will be explained.

Figure 15:
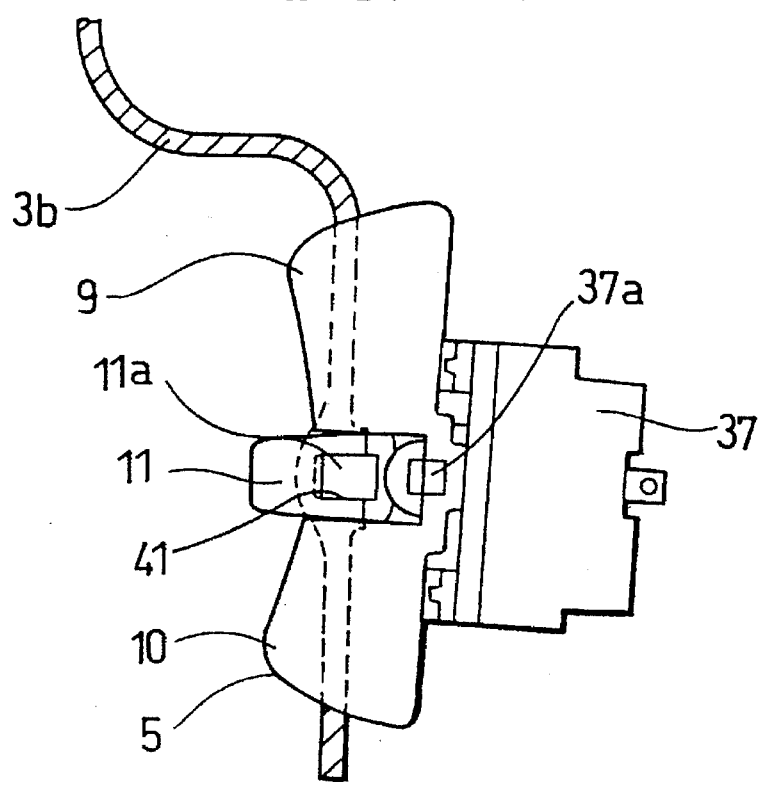
FIG. 15 is a schematic view showing a switch and a switch lever placed at the housing of the electric cable cutter with a lock knob unpressed.
Figure 16:
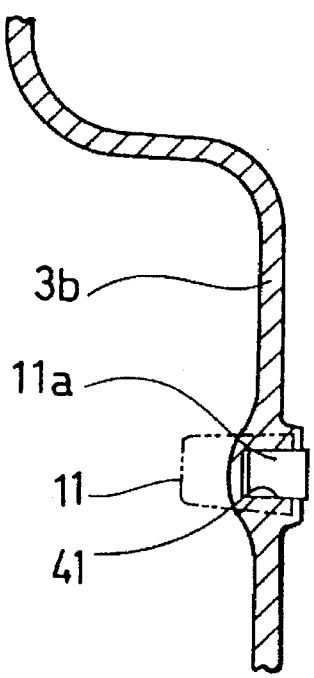
FIG. 16 is a view showing a part of a concave and a lock knob of the housing of the electric cable cutter.

FIG. 15 shows the switch 37 for turning on and off the driving unit of the electric cable cutter, and the switch lever 5 attached to the handle unit 3b of the housing 3 when the lock knob 11 is not pressed. FIG. 16 is a partial view of the concave 41 and the lock knob 11 of the handle unit 3b (for clarity, the lock knob 11 is shown by a dotted line in part).

In the cases of FIG. 15 and FIG. 16, since the hooks 11a of the lock knob 11 are inserted into the concave 41 of the handle unit 3b (lock mode), the switch 37 does not turn on by driving the driving shaft 37a of the switch 37 although the forward switch lever 9 or the reverse switch lever 10 is pressed. Accordingly, the moving blade 2 cannot be rotated in neither directions even though the switch lever 5 is operated.

Figure 17:
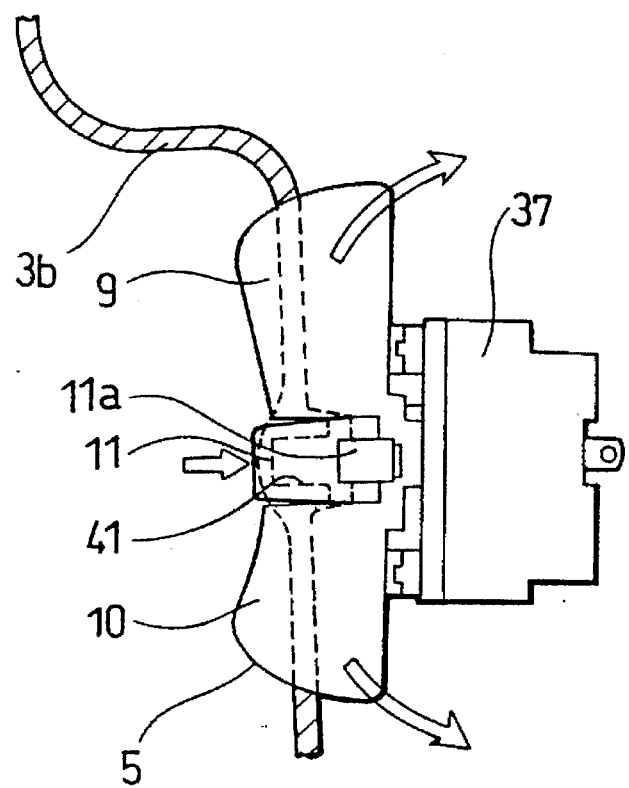
FIG. 17 is a schematic view showing the switch and the switch lever placed at the housing of the electric cable cutter with the lock knob pressed.

FIG. 17 shows the switch 37 for turning on and off the driving unit of the electric cable cutter, and the switch lever 5 attached to the handle unit 3b of the housing 3 when the lock knob 11 is pressed. FIG. 16 is a partial view of the concave 41 and the lock knob 11 of the handle unit 3b (for clarity, the lock knob 11 is shown by a dotted line in part).

Figure 18:
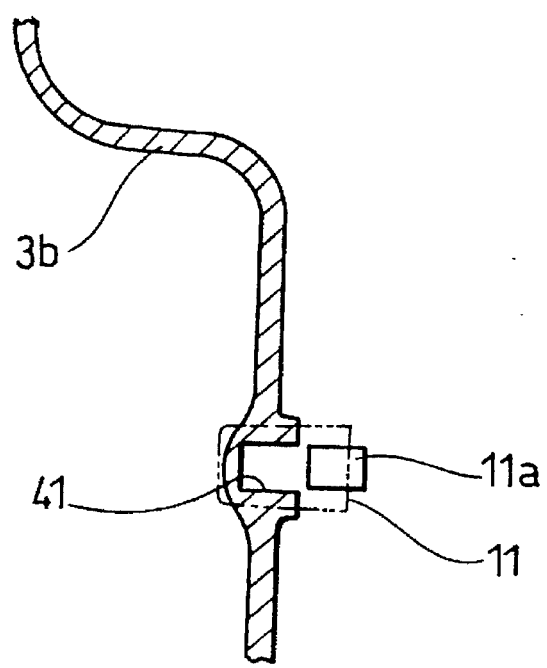
FIG. 18 is a view showing a part of the concave and the lock knob of the housing.

In the case of FIG. 17 and FIG. 18, since the hooks 11a of the lock knob 11 are released from the concave 41 of the handle unit 3b (unlock mode), the driving shaft 37a of the switch 37 is turned on when the forward switch lever 9 is pressed, so that the moving blade 2 is rotated in the direction to cut the cable. Further, the driving shaft 37a of te switch 37 turns on when the reverse switch lever 10 is pressed, so that the moving blade 2 is rotated in the direction to reverse the moving blade 2 (in the direction not to cut the cable). Accordingly, the moving blade 2 can be rotated in either directions.

Figure 19:
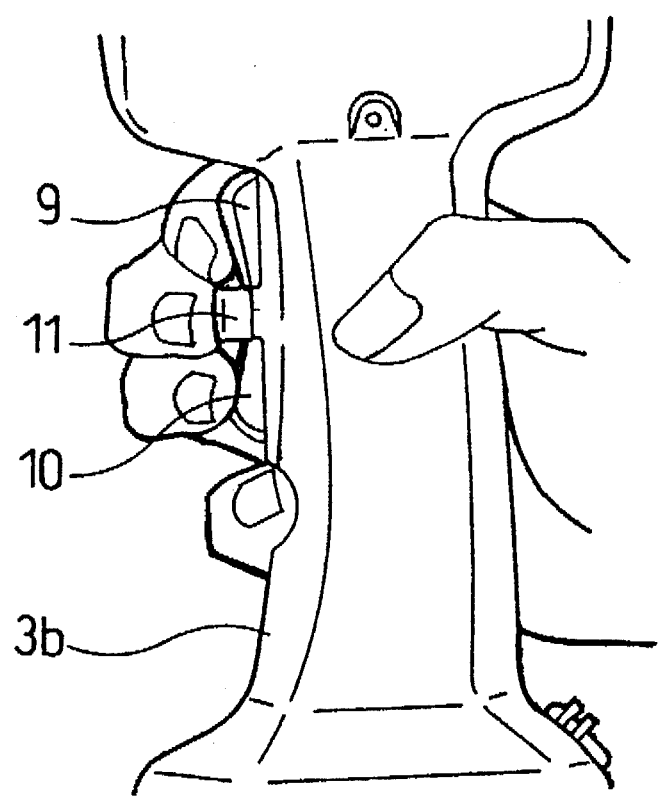
FIG. 19 is a view showing the switch lever in use.

As described above, since the electric cable cutter has the switch lever 5 attached on the handle unit 3b of the housing 3 and the lock knob 11 placed at the middle of the switch lever 5, it can be operated easily and safely by one hand holding the cutter as shown in FIG. 19.

Figure 20:
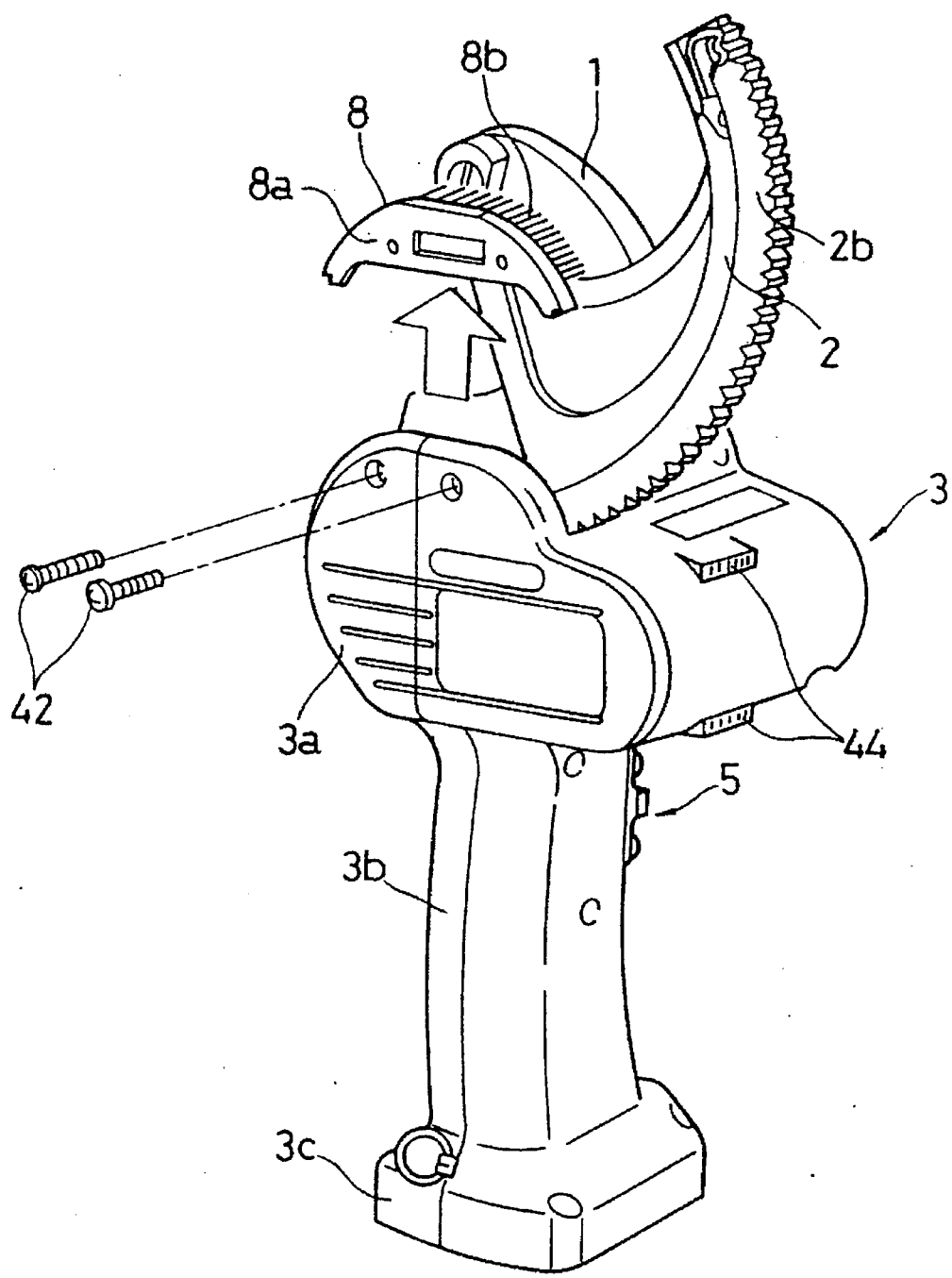
FIG. 20 is a perspective view showing the dust-proof brush of the electric cable cutter.

Next, referring to FIG. 20 and FIG. 21, the dust-proof brush 8 attached at the opening 6 of the body unit 3a of the housing 3 of the electric cable cutter will be described. As shown in FIG. 20, the dust-proof brush 8 is inserted into the opening 6 of the body unit 3a and attached with screws 42. Brush hairs 8b of the dust-proof brush cover the opening 6 so as to sweep the surface of the moving blade 2 which enters the opening 6.

The dust-proof brush 8 comprises a setting plate member 8a molded of resin substantially in a crest shape fitted with the shape of the opening 6, and hairs 8b set therein. For the setting member 8a, ABS, polycarbonate, polypropylene and engineering plastics can be utilized. In particular, polyacetal is preferable because it is superior in durability, heat resistance and maintenance. For the hairs 8b of the dust-proof brush 8, animal hair is preferable because it is superior in durability, heat resistance and restoration. In a view of obtaining, pig hair is easily utilized.

Figure 21:
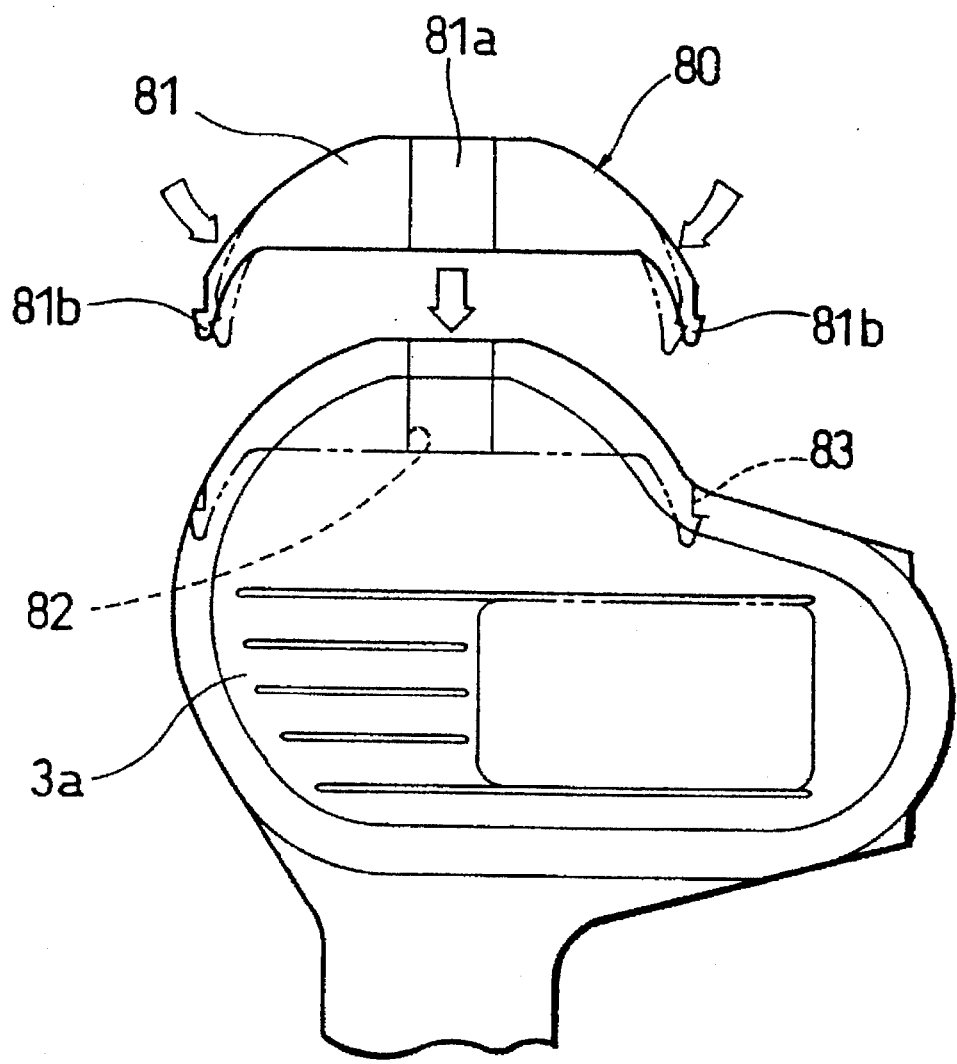
FIG. 21 is a front view showing an alternative example of the dust-proof brush of the electric cable cutter.

As the alternated example of the dust-proof brush, the dust-proof brush as shown in FIG. 21 can be formed so as to be easily removed from and attached to the opening. This dust-proof brush 80 has a thick attachment portion 81a at the middle of the setting plate member 81, and both ends of the setting plate member 81 are formed into legs and distal ends of the legs are formed into hooks 81b. A guide portion 82 and locking units 83 which fit to the attachment portion 81a and the hooks 81b are provided in the opening 6 of the body unit 3a. The dust-proof brush 80 is inserted into the opening 6 by pressing the sides thereof shown by the arrow in FIG. 21 to lock the hooks 81b to the locking units 83. In this example, polyacetals are preferably used for a setting plate member because it is superior in durability and elasticity.

The above-describe electric cable cutter is suitable for cutting copper stranded wire. To use the electric cable cutter of the present embodiment, the handle unit 3b of the electric cable cutter is held by one hand, and as shown in FIG. 2, a cable to be cut is set along the blade 1a of the stationary blade 1. At this point, if the tooth of the gear 2b of the moving blade 2 are not in position, the moving blade 2 is pushed in a direction shown as the arrow in FIG. 1 by fingers so as to be touched with the pinion 35 of the planetary reduction gear 13. Next, the forward switch lever 9 and the lock knob 11 are pressed together by fingers to turn on the switch 37, and then, the electric motor 14 inside the housing 3 starts driving the planetary reduction gear 13. Accordingly, the pinion 35 makes the moving blade 2 rotate around the shaft 7 in the direction shown by the arrow in FIG. 2 through the gear 2b with large torque induced by reduction, and then the moving blade 2 cuts the cable. If chips made during cable cutting drop or attach to the moving blade 2, the dust-proof brush 8 covered over the opening 6 of the housing 3 prevents the chips from going inside the opening 6 and sweeps the moving blade 2 to prevent the chips attached on the moving blade 2 from going inside the opening 6. Further, since the moving blade 2 can be released from the pinion 35, as shown in FIG. 5, the material to be cut such as a cable can be inserted from a space S. Therefore, the long cables can easily be cut by inserting them in the cutter from the space S.

Next, the second embodiments of the present invention will be described. The cable cutter of the first embodiment is suitable for cutting copper stranded wire, but in this embodiment, the cable cutter suitable for thin materials to be cut such as telecommunication wire (CCP cable) will be described.

Figure 22:
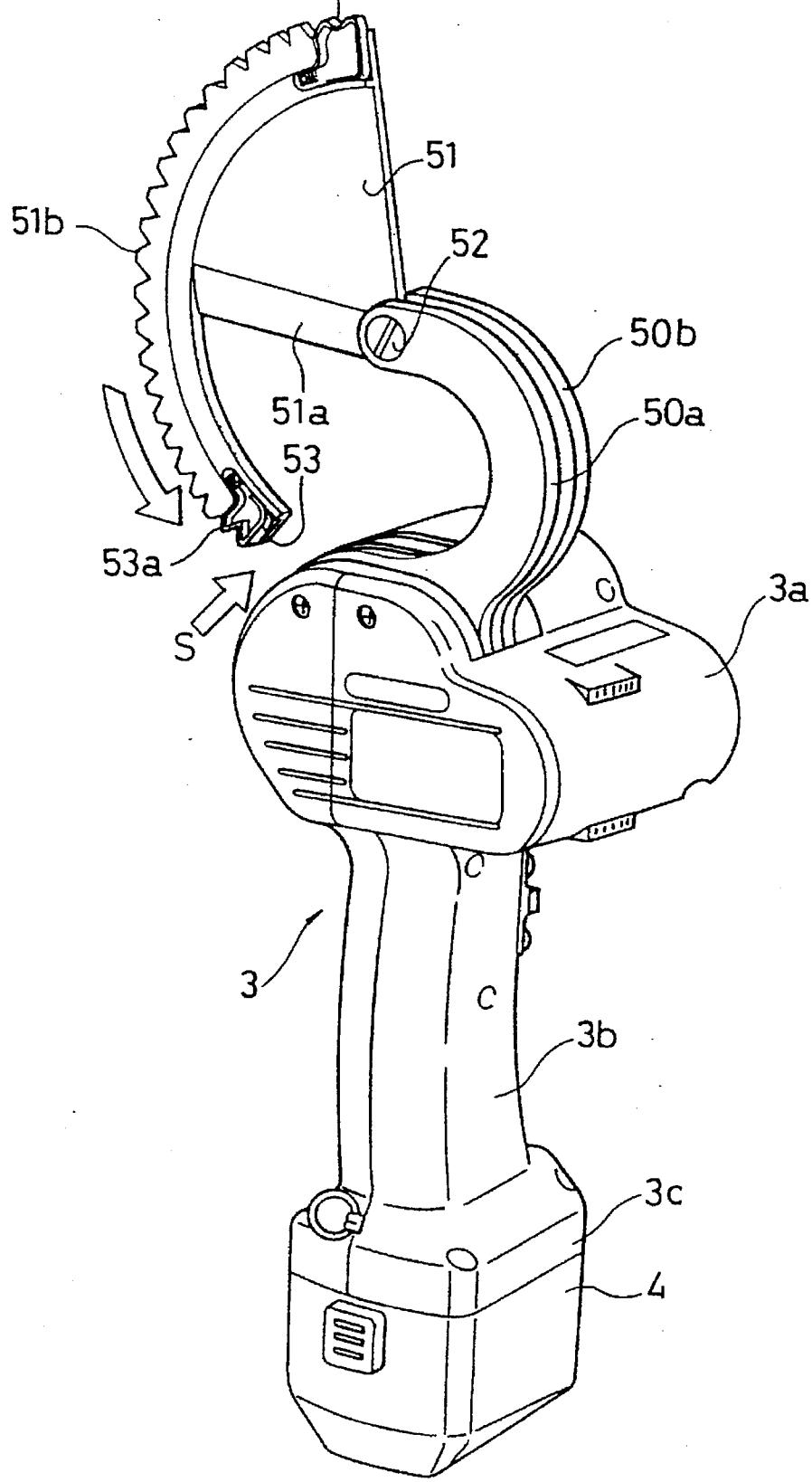
FIG. 22 is a perspective view showing an electric cable cutter according to the second embodiment of the present invention.

FIG. 22 is a front view of an electric cable cutter of the second embodiment. The electric cable cutter of the present embodiment is different from the cutter of the first embodiment in the cutter unit, and the remaining structure such as a driving unit, a switch lever are the same as those of the electric cable cutter of the first embodiment.

As shown in FIG. 22, in the electric cable cutter of the present embodiment, two edgeless blade guides 50a, 50b are fixed at the planetary reduction gear 13 instead of the stationary blade 1 having the blade 1a of the first embodiment. The moving blade 51 is pivotally fixed at the projecting ends of the blade guides 50a and 50b with a shaft 52 so as to move between the two blade guides 50a and 50b. Similar to the first embodiment, the moving blade 51 has a gear 51b formed at the outer rib to be engaged with a pinion 35 of the planetary reduction gear 13 placed inside the housing 3, and a teeth 53a made of a spring 53 at both end of the tooth 51b. The blade 51a of the moving blade 51 is not a sector but straight for a thin material to be cut, and its angle is sharper than that of the blade in the first embodiment.

Since the blade guides 50a and 50b have no blade, the material to be cut is never caught between the blade guides 50a, 50b and the moving blade 51. Accordingly, the electric cable cutter of the present embodiment is suitable for cutting thin materials, especially CCP cables.

Next, the third embodiment of the present embodiment will be described. In the present embodiment, an electric cable cutter to be utilized for thin cables, or hard cables such as SS cables will be explained. In the present embodiment, similar to the second embodiment, a cutter unit is different from the one in the first embodiment, and the remaining structure such as a driving unit, a switch lever are the same as in the first embodiment. For clarity, the present embodiment will be explained by comparing the cutter unit of the present embodiment with the first embodiment.

Figure 23:
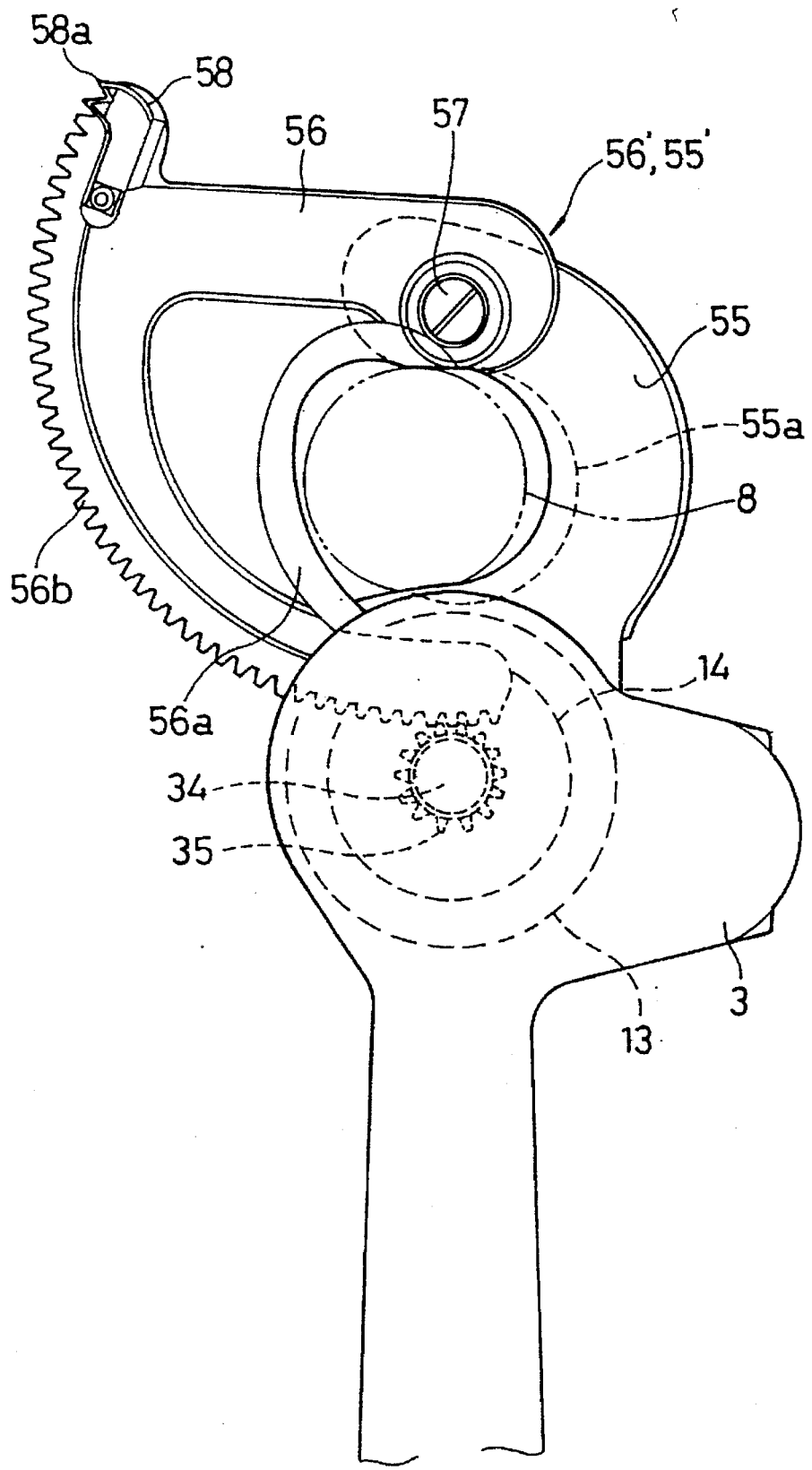
FIG. 23 is a front view showing an electric cable cutter according to the third embodiment of the present invention.
Figure 24:
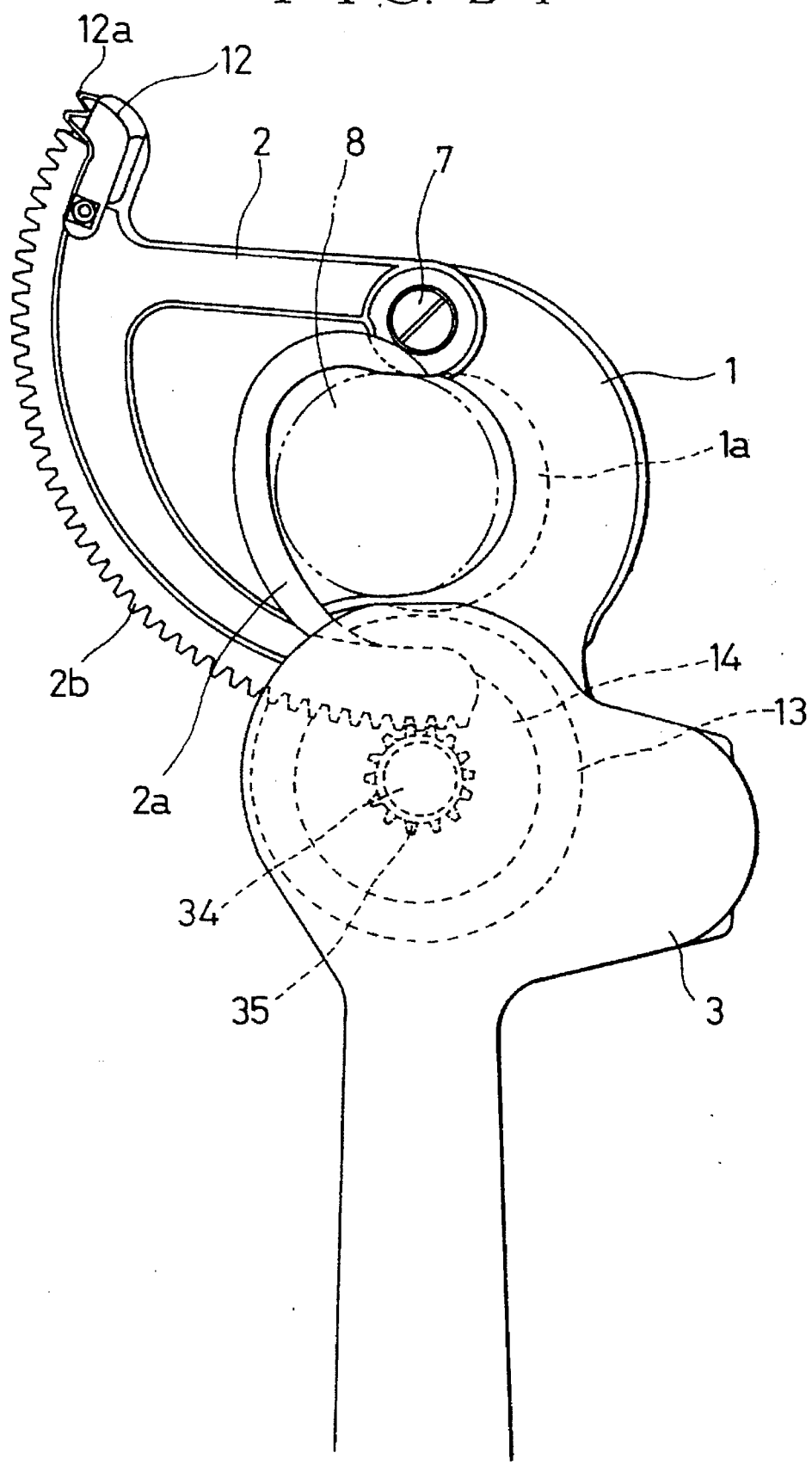
FIG. 24 is a front view showing the electric cable cutter of the first embodiment.

FIG. 23 schematically shows the electric cable cutter of the third embodiment of the present invention, and FIG. 24 shows the electric cable cutter of the first embodiment of the present embodiment.

The electric cable cutter of the present embodiment comprises a stationary blade 55 projecting from the top of the housing 3 and fixed at the planetary reduction gear 13, and a moving blade 56 supported with the shaft 57 of the stationary blade 55 and to be engaged with a pinion 35. The stationary blade 55 has a blade 55a at the inner rib and the moving blade 56 has a blade 56a at the inner rib and a gear 56b at the outer rib so as to be engaged with the pinion 35 of the planetary reduction gear 13. Tooth 58a of the spring 58 are placed at the both ends of the tooth of the gear 56b to lead the smooth engagement between the tooth of the gear 56b and the pinion 35.

Figure 25A:
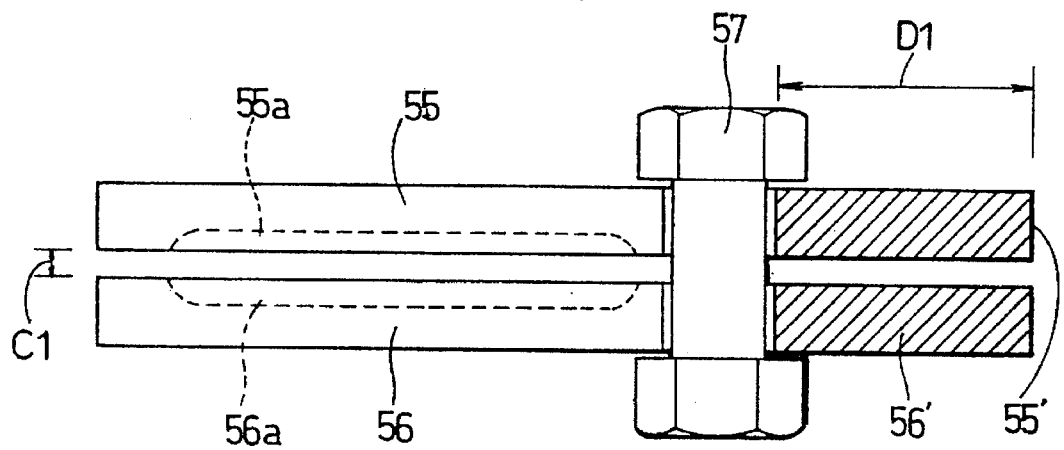
FIG. 25A is a view illustrating a gap between the stationary blade and the moving blade of the electric cable cutter of the third embodiment.
Figure 25B:
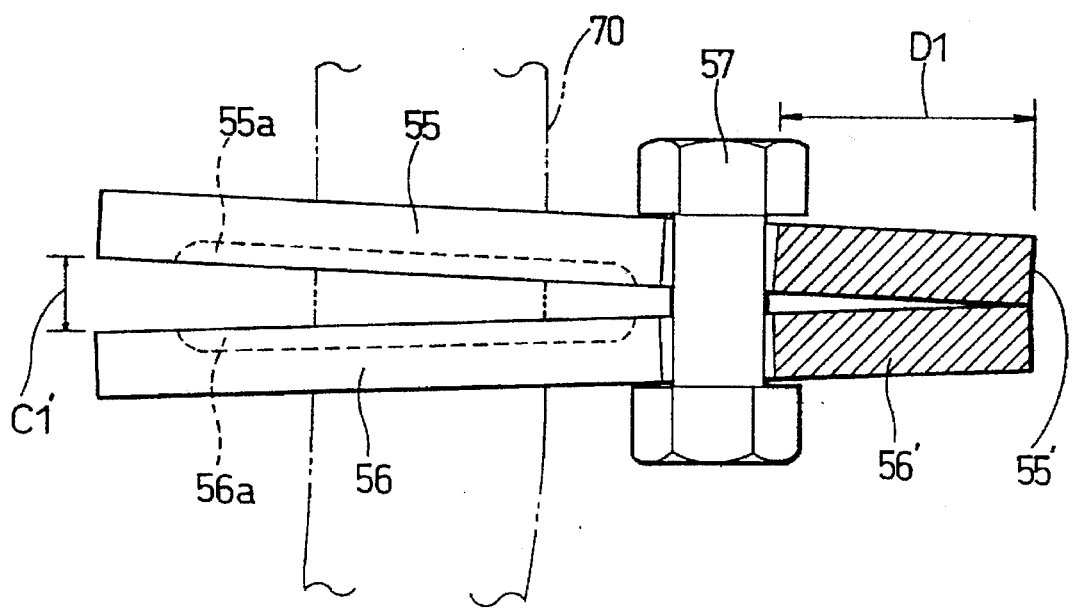
FIG. 25B is a view illustrating a space between the blades of the electric cable cutter of the third embodiment when the cable is cut.
Figure 26A:
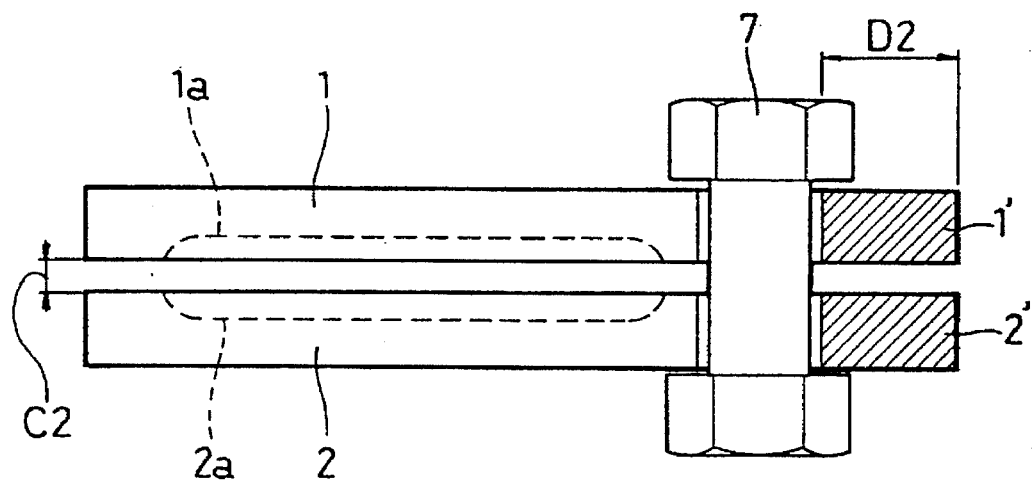
FIG. 26A is a view illustrating a gap between the stationary blade and the moving blade of the electric cable cutter of the first embodiment.
Figure 26B:
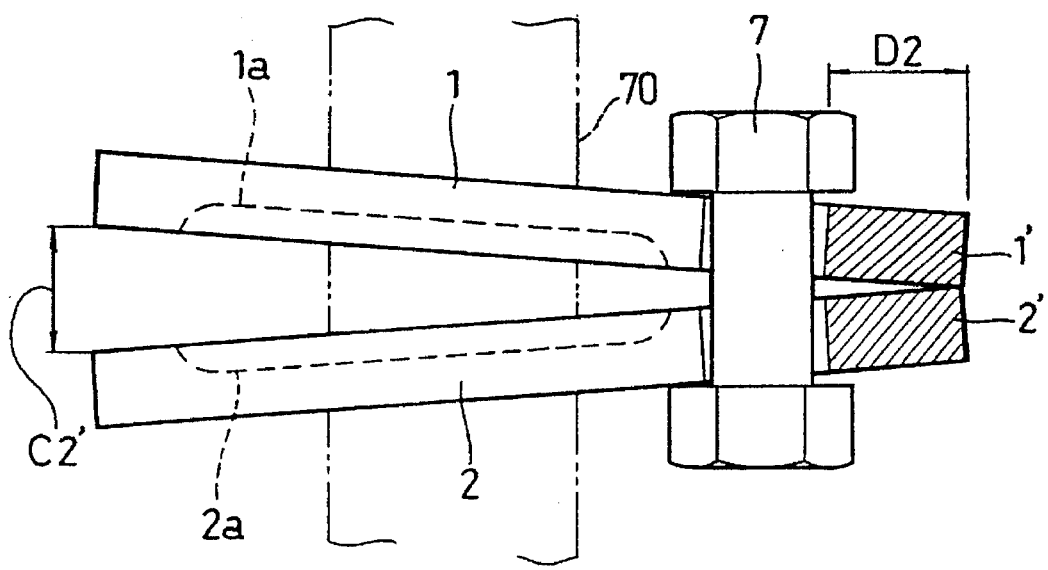
FIG. 26B is a view illustrating a gap between the blades of the electric cable cutter of the first embodiment when the cable is cut.

FIG. 25A schematically shows a gap between the stationary blade 55 and the moving blade 56 of the electric cable cutter of the third embodiment, and FIG. 25B schematically shows a space between the stationary and moving blades when the electric cable cutter of the third embodiment cuts a cable. Similarly, FIG. 26A schematically shows a gap between the stationary blade 1 and the moving blade 2 of the electric cable cutter of the first embodiment, and FIG. 26B schematically shows a space between the stationary and moving blades when the electric cable cutter of the first embodiment cuts a cable.

The electric cable cutters of the third and first embodiments shown in FIG. 23 and FIG. 24 utilize a shearing mechanism of two blades, so that the gap C1, C2 is required between the stationary blade 55, 1 and the moving blade 56, 2, respectively.

First, the gap in the electric cable cutter of the first embodiment will be described. When the cable 70 is cut, the portions 1', 2' of reaction opposite to the portions 1, 2 are brought in contact near the shaft 7. In other words, the space C2' between the blades 1a and 2a is determined by the area D2 of the portions of reaction 1', 2' since the side pressure acts on the stationary blade 1 and the moving blade 2 so that the blades open. In result, when the electric cable cutter of the first embodiment is utilized for a thin wire or a hard material to be cut, outside materials such as an insulator film are caught between the stationary blade 1 and the moving blade 2, which may leave the cable uncut.

Since the space C2' between the blades is large during cable cutting, deflection affects the constituting units such as the stationary blade 1, the moving blade 2, the shaft 7 and others. In the case of large deflection, it may deteriorate the durability of the cable cutter.

On the other hand, in the electric cable cutter of the third embodiment shown in FIG. 25B, the area D1 of the portions 55', 56' of reaction near the shaft 57 supporting the stationary blade 55 and the moving blade 56 is formed larger than the area D2 in the first embodiment.

Therefore, although the gap C1 shown in FIG. 25A is the same as the gap C2 in the first embodiment, the area D1 of portions 55', 56' of reaction of the stationary blade 55 and the moving blade 56 is larger than those of the first embodiment. Further, as shown in FIG. 25B, although the side pressure acts on the stationary blade 55 and the moving blade 56 when the cable 70 is cut, the position where the portions 55', 56' of reaction are in contact is apart from the shaft 57, as compared with the first embodiment, so that the space C1' between the blades 55a, 56a can be small. As the area D1 gets large, the space between the blades becomes small; however, in view of weight and cost, the area D1 is preferably twice larger than the D2 of the first embodiment.

With the above-described structure, the space C1' between the blades 55a, 56a can be made very small while the cable is cut, so that when it is applied to the thin material to be cut or the hard material to be cut, the coating of the thin wire is never caught between the blades. Further, the deflection of the constituting unit is small, so that the durability of the cable cutter is improved.

The present invention is not limited to the above embodiments but may be varied in many ways. For example, for the hard materials to be cut, the angle of the blade can be made large to increase the strength of the blade. The angle and thickness of the blade can be varied for kinds of the materials to be cut.

Figure 27:
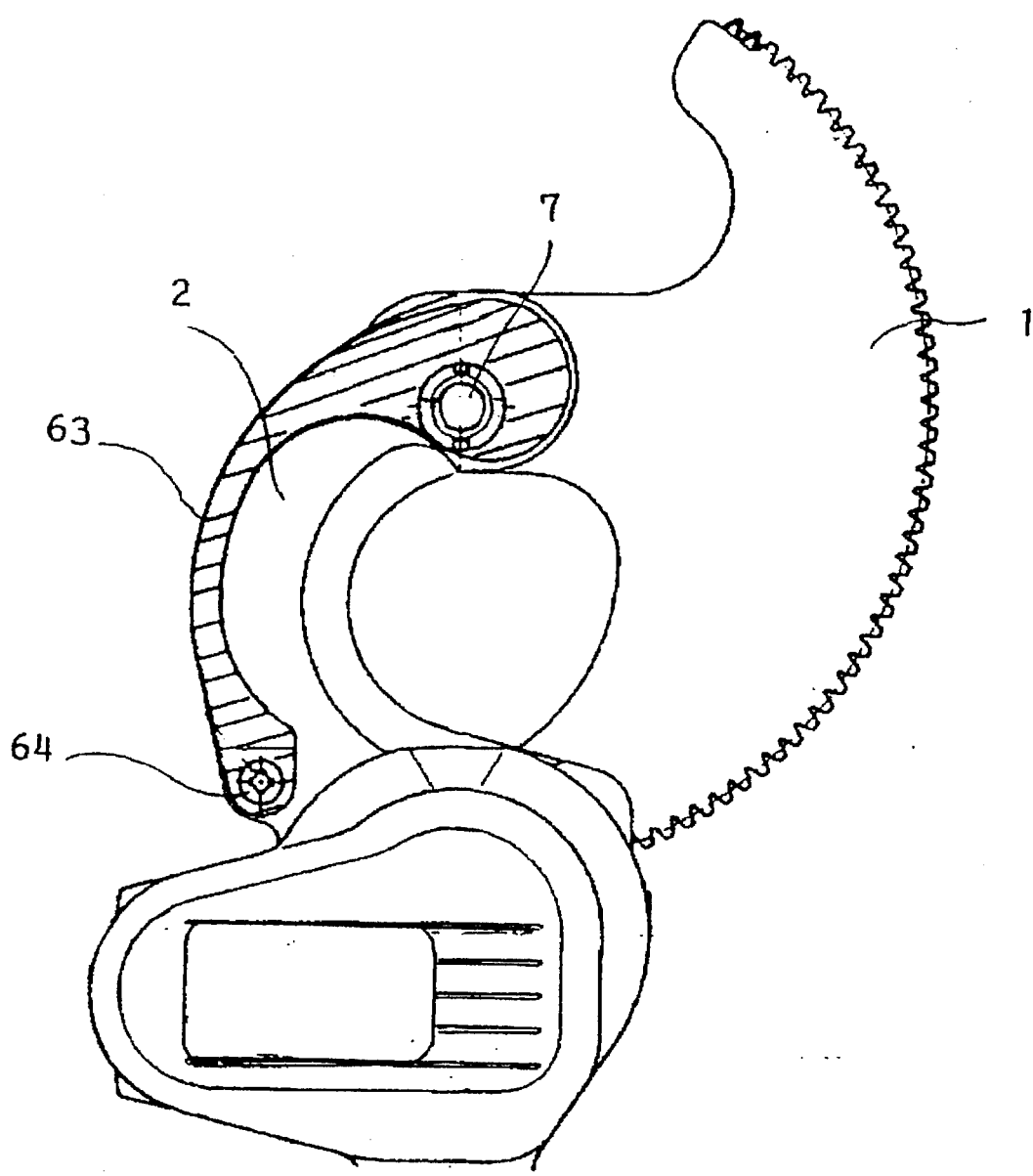
FIG. 27 is a front view showing the stationary blade with a protector attached.

Further, as shown in FIG. 27, a protector 63 can be fixed at each side by a shaft 7 and a screw 64 to the stationary blade 1 so as to be along the outer rib of the stationary blade 1 in order to prevent the fragments of the stationary blade from being scattered when the stationary blade is damaged.

Further, in the above-described embodiment, the battery cartridge is utilized as a power source, but an AC adaptor can be used in addition to the battery cartridge. Then, when the worker uses the cable cutter in the place where the AC source is provided, the cable cutter can be used longer than the case of the rechargeable battery.

Further, in the above-described embodiment, the moving blade can be rotated in both forward and reverse directions, but if it does not have to be reversed, the driving unit can be constructed so that the moving blade is rotated only in the forward direction. In this case, the spring 12 does not need to be provided at the both ends of the moving blade but only at one end thereof.

Furthermore, in FIG. 26A and FIG. 26B, to clarify the comparison, a collar of the shaft 57 is projected from the moving blade 56 but as shown in FIG. 1, the collar of the shaft 7 can be set in the moving blade 2, which clears the surface of the blade.

Thus, as described above in detail, according to the electric cable cutters of the present invention, the user easily cuts the cable by one hand at the inconvenient places, e.g., at height. Further, the electric cable cutter is portable since the rechargeable battery is utilized, so that the cord is not needed, and it can be utilized in any place.

Further, the driving torque at the pinion of the planetary reduction gear is large, so that a cable such as a copper stranded wire can easily be cut with a small power. Further, the dust-proof brush covers the opening of the housing, so that the chips are swept away from the moving blade during cutting operation and the chips do not enter the housing 3. Accordingly, the machine trouble is prevented.

Furthermore, the spring having the teeth formed substantially the same as the tooth of the gear of the moving blade is attached to the end of the tooth of the moving blade, so that damage to the tooth can be reduced.

While the invention has been shown and described with reference to the illustrated embodiments, it should be understood that various changes in form and details may be made without departing from the scope of the invention which is defined in the appended claims.

What is to be claimed is:

1. An electric cable cutter for cutting a cable comprising:

a housing;

an electric motor provided in said housing;

a planetary reduction gear driven by said electric motor, provided in said housing;

a stationary blade fixed at said planetary reduction gear, provided in said housing so as to project from an opening of said housing;

a moving blade having a first blade at an inner rib and a gear at an outer rib, provided in said housing so as to project from said opening of said housing, pivotally placed at said stationary blade with a shaft, said moving blade being rotated by said planetary reduction gear;

a power source for said electric motor; and a switch for turning on and off said electric motor.

2. An electric cable cutter according to claim 1, wherein said power source is a rechargeable battery, and said rechargeable battery is placed in a battery cartridge removable from said housing.

3. An electric cable cutter according to claim 1, wherein said gear formed on the outer rib of said moving blade has a sector shape.

4. An electric cable cutter according to claim 1, wherein said stationary blade has a second blade at an inner rib.

5. An electric cable cutter according to claim 1, wherein said first blade is formed in an arc shape.

6. An electric cable cutter according to claim 1, wherein a spring having a teeth substantially the same as tooth of said gear of said moving blade is attached at an end of said gear of said moving blade.

7. An electric cable cutter according to claim 1, wherein a protector is provided to said stationary blade so that fragments of said stationary blade are not scattered when said stationary blade is damaged.

8. An electric cable cutter according to claim 1 further comprising a switch lever for operating said switch, fixed at a driving unit of said switch, attached at an outer surface of said housing, said switch lever having a lock knob including a protrusion to be inserted in a concave formed in said housing, provided with a spring;

said switch driving said moving blade in a forward direction and a reverse direction by operating said switch lever;

when said lock knob is pressed, said protrusion being released from said concave and said switch lever is movable in a direction to drive said switch;

when said lock knob is unpressed, said protrusion being fitted in said concave to prevent the drive of said switch.

9. An electric cable cutter according to claim 1, wherein a dust-proof brush is attached at said opening of said housing so as to cover said opening and to sweep said moving blade.

10. An electric cable cutter according to claim 9, wherein said dust-proof brush comprises a setting plate member of polyacetals and animal hair set in said setting plate member.

11. An electric cable cutter according to claim 1, wherein two stationary blades are fixed at said planetary reduction gear with a predetermined space, and said two stationary blades are edgeless; and said moving blade is pivotally supported at said stationary blades so as to move between said two stationary blades.

12. An electric cable cutter according to claim 11, wherein said first blade of said moving blade is straight.

13. An electric cable according to claim 1, wherein area of portions of reaction opposite to portions of action of said moving blade and said stationary blade is formed large enough so that the location where the portions of reaction of said stationary blade and said moving blade are brought in contact during cable cutting is apart from the shaft by a predetermined length.

* * * * *